(12) United States Patent
Hammack et al.

(10) Patent No.: US 6,449,624 B1
(45) Date of Patent: Sep. 10, 2002

(54) VERSION CONTROL AND AUDIT TRAIL IN A PROCESS CONTROL SYSTEM

(75) Inventors: Stephen Gerard Hammack, Austin; Larry Oscar Jundt, Round Rock, both of TX (US); J. Michael Lucas, Leicester (GB); Andrew P. Dove, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/420,182

(22) Filed: Oct. 18, 1999

(51) Int. Cl.[7] .......................... G06F 17/30; G06F 12/00
(52) U.S. Cl. ........................ 707/203; 707/100
(58) Field of Search .............................. 707/203, 100; 717/11; 700/83, 29; 713/1

(56) References Cited

U.S. PATENT DOCUMENTS

| | | | |
|---|---|---|---|
| 5,619,716 A | * 4/1997 | Nonaka et al. | 717/11 |
| 5,649,200 A | 7/1997 | Leblang et al. | 395/703 |
| 5,784,577 A | * 7/1998 | Jacobson et al. | 395/284 |
| 5,903,897 A | * 5/1999 | Carrier, III et al. | 707/203 |
| 5,940,294 A | * 8/1999 | Dove | 364/188 |
| 6,092,189 A | * 7/2000 | Fisher et al. | 713/1 |
| 6,112,126 A | * 8/2000 | Hales et al. | 700/29 |

OTHER PUBLICATIONS

Microsoft Visual SourceSafe User's Guide, Version 5.0 (1996).
Search report under Section 17 issued in Great Britain Application GB 0025511.7, dated Oct. 10, 2001.

* cited by examiner

Primary Examiner—Frantz Coby
(74) Attorney, Agent, or Firm—Marshall, Gerstein & Borun.

(57) ABSTRACT

A system useful for controlling a process includes a computer-readable medium and a processor in communication with the computer-readable medium. The system further includes a first database and a second database. The first database stores first data representative of a first configuration of the process, while the second database stores second data representative of a second configuration of the process. A configuration routine of the system is stored in the computer-readable medium and configured to be executed by the processor to facilitate a modification of the first configuration of the process. A version control routine of the system is stored in the computer-readable medium and configured to be executed by the processor to store in the second database third data indicative of the modification of the first configuration of the process.

44 Claims, 14 Drawing Sheets

VCat Text View - File Orig, version 13

```
            'OUT1.ST' := Bad;        (* Set the output status to Bad for one scan to force downstream
        ELSE
            'OUT1.ST' := 'IN4.ST';   (* Otherwise the status of the compensated flow is the same a
        END_IF;

(* Note: If measured pressure or temperature status is Bad when the input is needed, the r
           value is substituted for the measured value, which effectively disables compensation. Bu
           transitions are achieved by setting the output status to Bad for one scan, causing a downs
           control block to shed mode and return (if status option Target to Man if Bad In is not used)

EXPTYP = 29192
    END Parameter "T_EXPRESSION"
END Usage "CALC1"

BEGIN Parameter "ABS_PRESS_CF"
    Attribute Type = Value Float
    Attribute Group Name = Non-Flippant Parameters
    Attribute Connection Type = Internal Input
    Online Changeable = TRUE
    Fields
        CV = 14.700
END Parameter "ABS_PRESS_CF"

BEGIN Parameter "ABS_TEMP_CF"
    Attribute Type = Value Float
    Attribute Group Name = Non-I/O Parameters
    Attribute Connection Type = Internal Input
    Online Changeable = TRUE
    Fields
        CV = 459.690
END Parameter "ABS_TEMP_CF"

BEGIN Parameter "COMP"
    Attribute Type = Enumeration
    Attribute Group Name = Non-I/O Parameters
```

FIG. 11

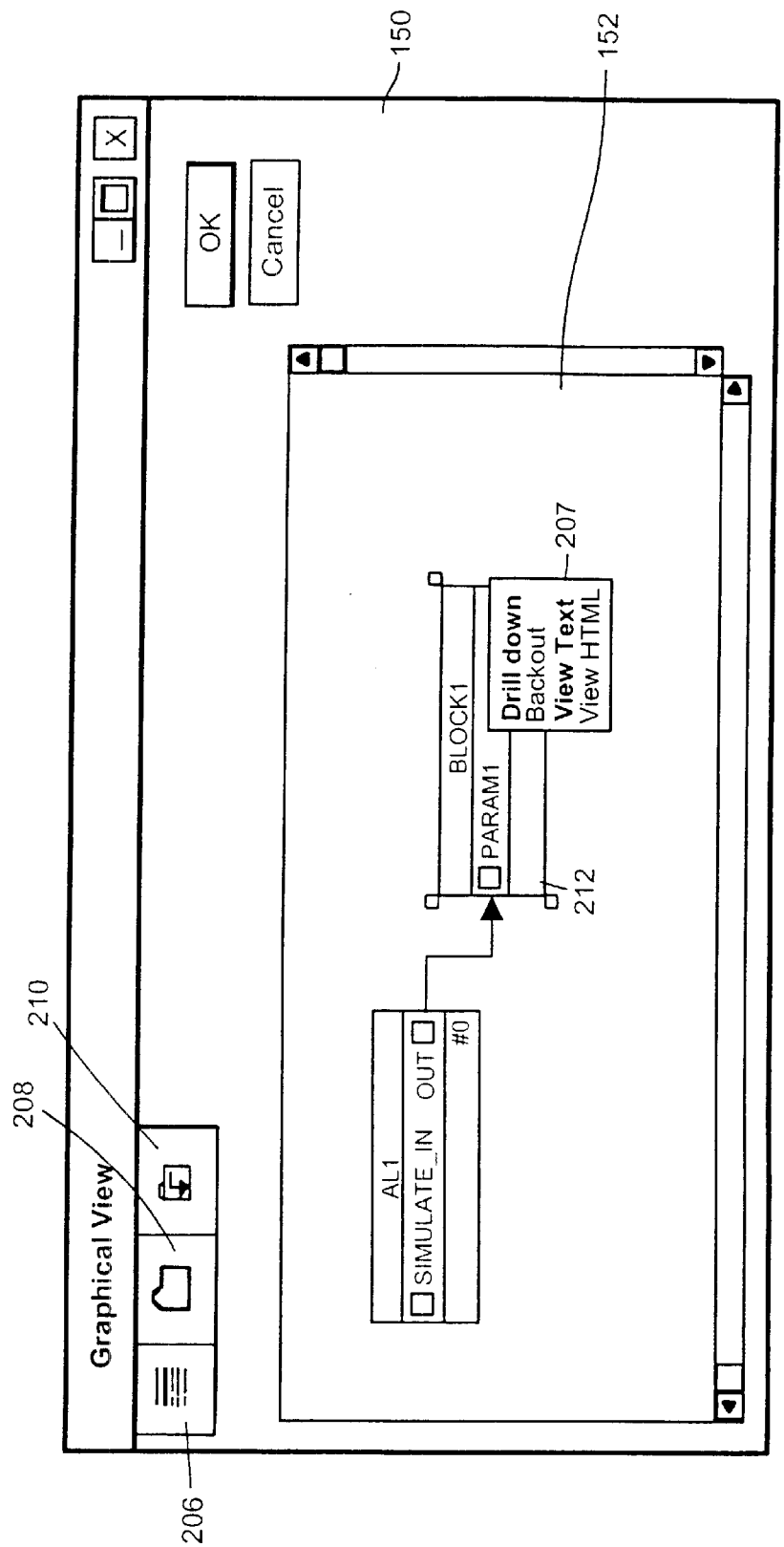

VERSION CONTROL AND AUDIT TRAIL IN A PROCESS CONTROL SYSTEM

FIELD OF THE INVENTION

The present invention relates generally to process control systems and, more particularly, to a system that monitors and records modifications to the process to provide version control therefor.

DESCRIPTION OF THE RELATED ART

Process control systems, like those used in chemical, petroleum or other processes, typically include at least one centralized process controller communicatively coupled to at least one host or operator workstation and to one or more field devices via analog and/or digital buses or other communication lines or channels. The field devices, which may be, for example, valves, valve positioners, switches, and transmitters (e.g., temperature, pressure and flow rate sensors), perform functions within the process such as opening or closing valves and measuring process parameters. The process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controller is typically made available to one or more applications executed by the operator workstation to enable an operator to perform any desired function with respect to the process, such as viewing the current state of the process, modifying the operation of the process, and configuring the process.

Several software tools have been developed to assist the operator in configuring and otherwise modifying the process. Such tools provide a graphical representation of the process that displays each function performed by the field devices and the controller as a respective item or object. The items may be organized and set forth in a hierarchal environment such that, for instance, all of the functions performed by a particular field device are grouped or listed together. The items may also be displayed within a control template such that items are shown in their functional relationships in the process. For example, a control template may constitute a sequential flow chart having a series of interconnected blocks representative of multiple items having input and output relationships defined by interconnecting lines.

Each item (as well as any input or output relationship between items) is defined by data stored in a configuration database associated with the software configuration tools. The database as well as the software tools are made available via a network that typically supports multiple workstations for numerous process operators and other users, each of whom has access to the data for administrative, process configuration, and other purposes. Modification of the data in the configuration database may, however, lead to version control problems when, for example, one operator is unaware of the work of another operator, or when too many modifications have occurred to determine how to return to a previous configuration or version of the process. For instance, a prior process control system utilizing the Delta™ software available from Fisher-Rosemont Systems, Inc., merely stores data indicative of the date on which the modification was made and the user responsible for the modification. Such data does not typically enable a user to reconstruct the configuration of prior versions of the process.

These version control concerns have been addressed in the software development context by configuration management tools, such as ClearCase from Rational and Microsoft Visual SourceSafe®. More particularly, these products track, control, and manage the development of a software routine in order to assist in subsequent debugging and development efforts. To this end, data indicative of both the current and past versions of the code is stored. Such configuration management tools, however, are usually limited to textual presentations of the data and, thus, are not well-suited for storing and displaying information that is typically set forth in a graphical manner.

A graphical interface has been developed by National Instruments to facilitate programming in connection with instrumentation systems. According to information gathered from the National Instruments Internet website (www.ni.com), a product marketed under the name "Lab-VIEW" utilizes a graphical programming language, the G language, to support this graphical programming interface. The website further describes the LabVIEW product as including a development tool that allows the programmer to graphically compare the differences between two files of code set forth in the G language.

SUMMARY OF THE INVENTION

In accordance with one aspect of the present invention, a system useful for controlling a process includes a computer-readable medium, a processor in communication with the computer-readable medium, and first and second databases. The first database stores first data representative of a first configuration of the process, and the second database stores second data representative of a second configuration of the process. The inventive system further includes a configuration routine and a version control routine, both of which are stored in the computer-readable medium and configured to be executed by the processor. The configuration routine facilitates a modification of the first configuration of the process and the version control routine stores in the second database third data indicative of the modification of the first configuration of the process.

According to a preferred embodiment, the first database includes a configuration database such that the first configuration of the process corresponds with a current configuration version. The second database preferably includes a version control database such that the second configuration of the process corresponds with a past configuration version.

According to another preferred embodiment, the first and second configurations of the process include first and second pluralities of process items, respectively. Each process item of the first and second pluralities of process items has a respective item configuration such that the first configuration of the process includes the item configuration of each process item of the first plurality of process items, and the second configuration of the process includes the item configuration of each process item of the second plurality of process items.

According to yet another preferred embodiment, the version control routine monitors the modification of the first configuration of the process to gather the third data. The version control routine may monitor the modification by imposing a check-out/check-in procedure on the configuration routine. Alternatively, the check-out/check-in procedure is automatic.

BRIEF DESCRIPTION OF THE DRAWINGS

FIGS. 5–19 are screen displays generated by the version control and audit trail system of FIG. 4 to establish a user interface for the input and output of information relating to the configuration of multiple versions of the process in accordance with numerous embodiments of the present invention.

DESCRIPTION OF THE PREFERRED EMBODIMENTS

Processes typically require a great deal of ongoing design and development. As a result, it is often desirable to record data indicative of any modifications of the configuration of the process. For example, such configuration information is utilized in the pharmaceutical industries during monitoring by governmental agencies. As the complexity of the process (as well as the process control system) increases, it becomes more onerous to accurately determine the configuration of a prior version of the process.

The present invention provides a system and method for recording data indicative of modifications of the configuration of a process together with information relating to the modification, such as the identity of the user responsible for the modification, the time and date of the modification, and the reasoning behind the modification. The data is stored in accordance with the present invention as versions of the process configuration in a manner such that the inventive system and method enable a user to compare the differences between any two versions and return the process to a desired prior configuration version.

Figure 1:
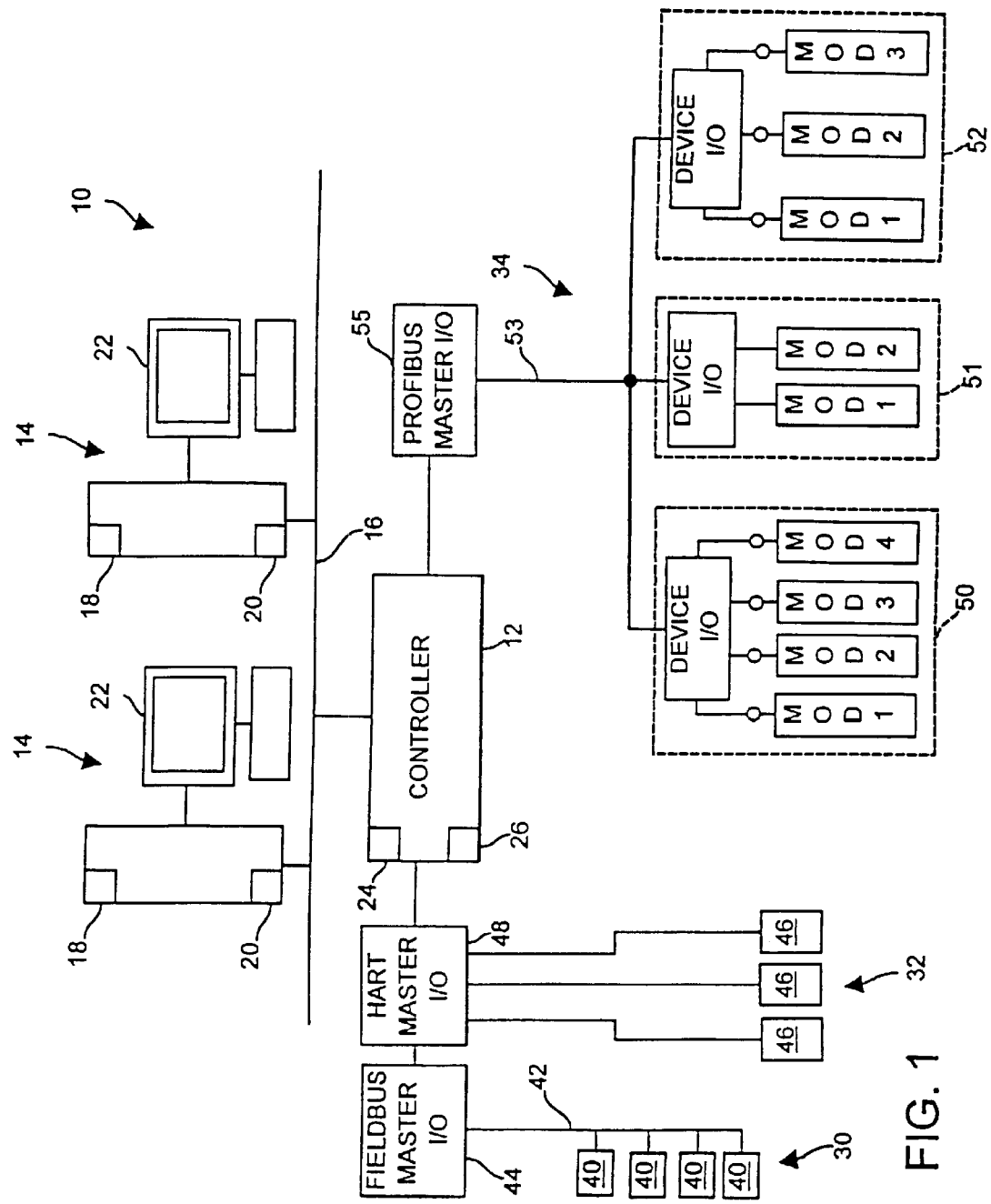
FIG. 1 is a block diagram of a process control system having a plurality of workstations and a controller for directing and configuring a process utilizing a process configuration system implemented on the plurality of workstations.

Referring now to FIG. 1, a process control system 10 includes a process controller 12 connected to one or more host workstations or computers 14 (which may be any type of personal computer, workstation, etc.) via a communication network 16 such as an Ethernet connection or the like. Each of the workstations 14 includes a processor 18, a memory 20 and a display screen 22. Similarly, the controller 12, which may be by way of example only, the DeltaV™ controller sold by Fisher-Rosemont Systems, Inc., includes a processor 24 and a memory 26 for storing programs, control routines and data used by the processor 24 to implement control of a process. The controller 12 is coupled via the network 16 to numerous field devices within different device networks, including, for example, a Fieldbus device network 30, a HART device network 32, and a Profibus device network 34. Of course, the controller 12 could be connected to other types of field device networks such as 4–20 mA device networks and other local or remote I/O device networks in addition to or instead of the device networks illustrated in FIG. 1. The controller 12 implements or oversees one or more process control routines stored therein or otherwise associated therewith and communicates with devices within the device networks 30, 32, and 34 and with the host workstations 14 to control the process and to provide information pertaining to the process to one or more users, operators, process designers, etc.

In an exemplary case, the Fieldbus device network 30 includes Fieldbus devices 40 connected via a Fieldbus link 42 to a Fieldbus master I/O device 44 (commonly referred to as a link master device) which, in turn, is connected to the controller 12 via a local connection. Similarly, the HART device network 32 may include a number of HART devices 46 connected via communication lines to a HART master I/O device 48 which is connected to the controller 12 via a standard local bus or other communication line. The Profibus device network 34 is illustrated as including three Profibus slave devices 50, 51, and 52 connected via a Profibus link or bus 53 to a Profibus master I/O device 55. The Profibus master I/O device 55 may be in the form of a Profibus PCMCIA card attached to a standard I/O interface card.

Generally speaking, the process control system 10 of FIG. 1 may be used to implement batch processes in which, for example, one of the workstations 14 or the controller 12 executes a batch executive routine, which is a high level control routine that directs the operation of one or more of the field devices (as well as perhaps other equipment) to perform a series of different steps (commonly referred to as phases) needed to produce a product, such as a food product or drug. To implement different phases, the batch executive routine uses what is commonly referred to as a recipe which specifies the steps to be performed, the amounts and times associated with the steps, the order of the steps, and the like. Steps for one recipe might include, for example, filling a reactor vessel (not shown) with appropriate materials, mixing the materials within the reactor vessel, heating the materials within the reactor vessel to a certain temperature for a certain amount of time, emptying the reactor vessel and then cleaning the reactor vessel to prepare for the next batch run. Each of these steps may define a respective phase of the batch run, and the batch executive routine within the controller 12 will execute a different control algorithm for each one of the phases. Of course, the specific materials, amounts of materials, heating temperatures and times, etc. may be different for different recipes and, consequently, these parameters may change from batch run to batch run depending on the product being manufactured or produced and the recipe being used.

The process control system 10 may also be capable of implementing process operations that are continuous in nature in addition to those initiated as part of a batch run. Thus, as used herein, the "process" should be understood to refer to, and include, any number of batch and/or continuous process operations executed or implemented by the process control system 10. During execution of the process, the process control system 10 is said to be in a run-time mode. The parameters and control algorithms to be utilized during run-time are defined while the process control system 10 resides in a configuration mode of operation. During the configuration mode (which may overlap in certain instances with periods of time in which process operations are being executed), one or more software applications executed on one or more of the workstations 14 are utilized to enable a user to specify the parameters, control algorithms, etc. for the process and, in so doing, generally design the configuration of the process.

Figure 2:
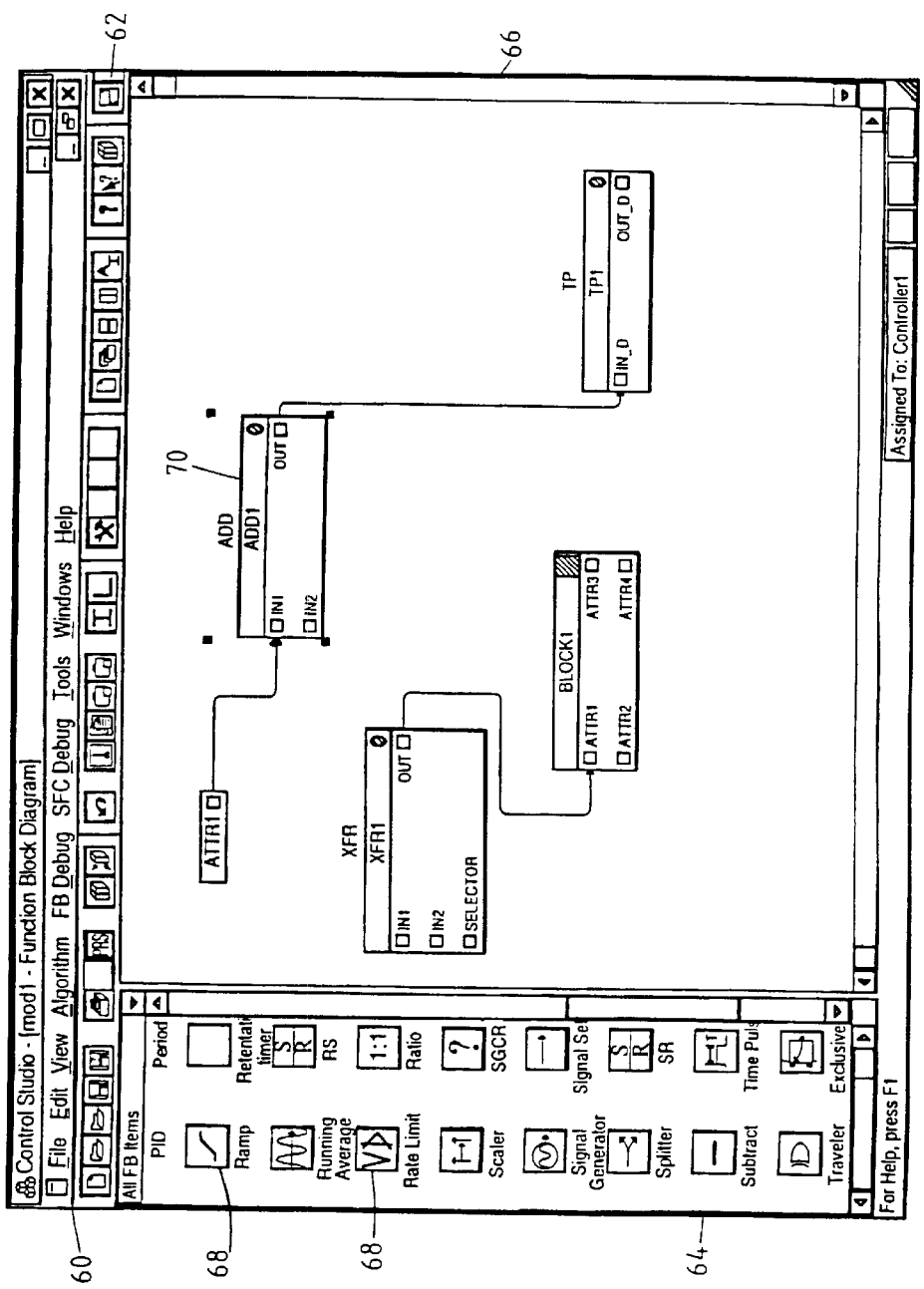
FIG. 2 is an exemplary screen display generated by the process configuration system to establish a user interface therefor via one of the workstations of FIG. 1.

With reference now to FIG. 2, the process control system 10 includes a process configuration system that is based on one or more process configuration applications, such as Control Studio™ and Recipe Studio™, which are both available from Fisher-Rosemont Systems, Inc. The process configuration applications, which may be implemented in software, are utilized to design either batch or continuous process operations (collectively referred to hereinafter as "the process"), or some portion thereof. FIG. 2 is a screen display of a main control window of an exemplary process configuration application that enables a user to configure the process 10. The process configuration application of FIG. 2 is preferably executed on any one of the workstations 14, which may correspond with a centralized server (not shown) within the network 16. Alternatively, the application may execute in a distributed fashion such that more than one workstation 14 is responsible for implementation.

In general, the process configuration application provides a user interface that includes the main control window shown in FIG. 2. The main control window includes textual pull-down command menus 60, a pictographic command bar 62, a function library frame 64, and a flow diagram frame 66. Each of these portions of the user interface may be sized or positioned in accordance with typical windowing techniques. A plurality of icons 68 are displayed within the function library frame 64 each of which may be representative of a respective function block to be incorporated into a sequential flow chart created within the flow diagram frame 66. The sequential flow chart may, for example, define a control program to be executed during a phase of the process being designed. To build the control program, a user actuates one or more icons 68 by selecting the desired icon(s) in the library frame 64 with, for example, a pointing device (e.g., a mouse), and dragging the actuated icons(s) to the flow diagram frame 66. The process configuration application then creates an object within the flow diagram frame 66, such as an addition block 70, that is representative of a function block. Data associated with the block 70 in the flow diagram frame 66 defines the function performed as well as whether the block 70 has any input ports, output ports, and the like, which are accordingly represented graphically as part of the block as shown. Function blocks and other objects added to the sequential flow chart (such as an input parameter) are coupled with lines drawn by the user (with a drawing tool selected, for example, from the command bar 62) in the flow diagram frame 66 to establish the data relationships between the objects. Information relating to the time sequence in which each function block is to be executed may also be specified by the user and shown in connection with the displayed object.

The data representative of each function block, phase, etc. is stored in a configuration database, which is accessed and developed by the process configuration application. Practice of the present invention is not limited to any particular type of database and, thus, the configuration database may take on any form or structure. For example, the data stored in the configuration database need not be stored in a local or localized manner such that the data stored in the configuration database is distributed across the network 16. The configuration database, however, preferably comprises an object-oriented database located in the memory 20 of one of the workstations 14 for storing data representative of the process configuration, which includes, for example, the relationships between the function blocks assigned within the sequential flow chart designed in the flow diagram frame 66.

Once the sequential flow chart has been designed using the above-described functionality, the resulting control program may be stored as a composite item of the process configuration. Composite items developed by the Control Studio™ software system may, in turn, be utilized to build modules. To that end, data representative of a module may also be stored in the configuration database. Both composite items and modules may be represented using a sequential flow chart.

Further examples of items that may be represented using a sequential flow chart include recipes, procedures, and unit procedures. These items may be designed by another portion of the process configuration system, the Recipe Studio™ application, to be representative of a batch run (or portion thereof) to be executed as part of the process. The Recipe Studio™ application generates a user interface similar to that shown in FIG. 2, and may provide a library frame having icons representative of modules as well as function blocks. Data representative of the recipes, procedures, and unit procedures may then also be stored in the configuration database.

Together, the data representative of these function blocks, modules, recipes, etc. may define the process as it is currently being implemented by the process control system 10. To this end, the configuration database is accessed and utilized when instructions are downloaded to the controller 12 and the field devices.

Figure 3:
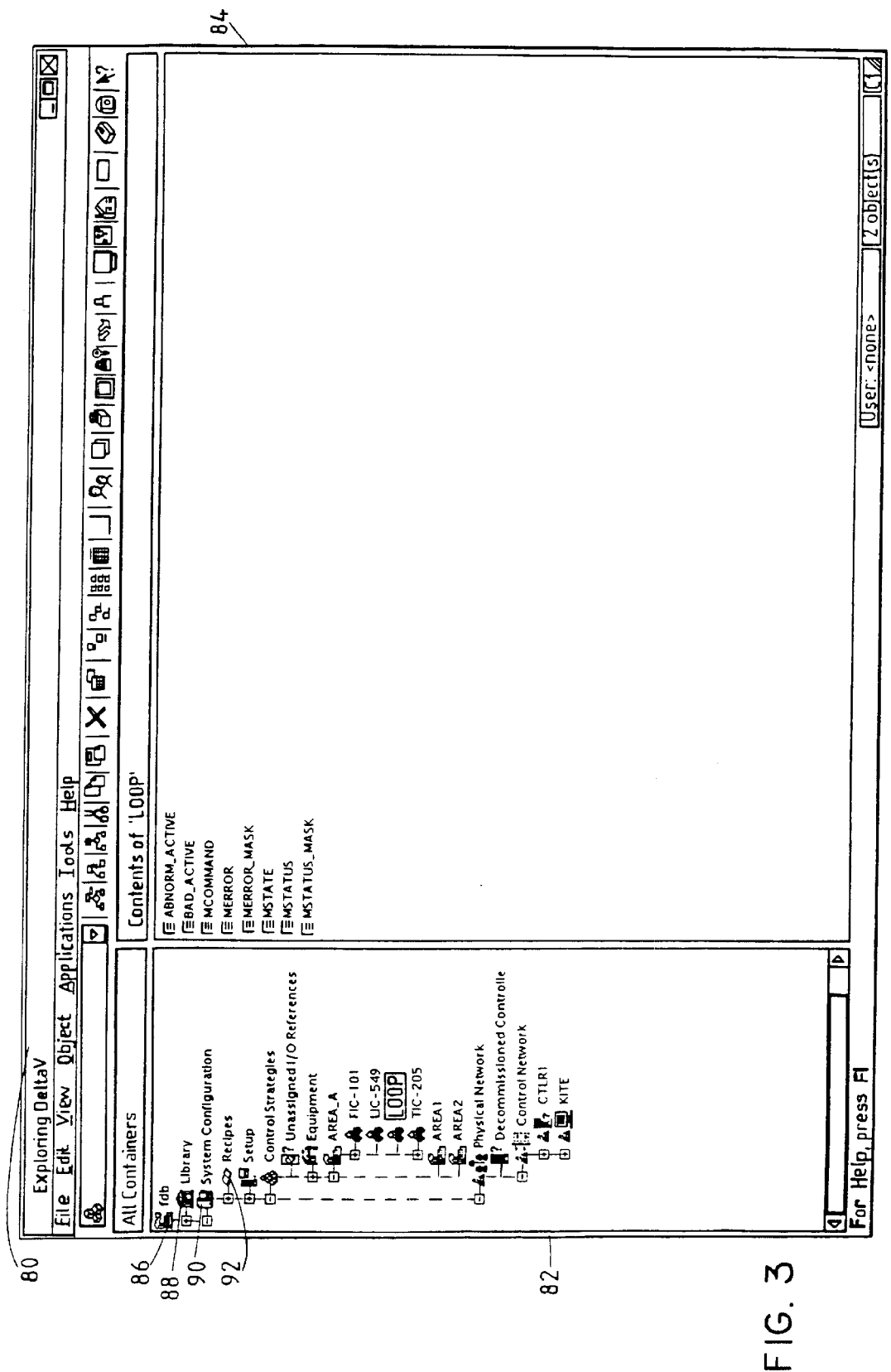
FIG. 3 is a further exemplary screen display generated by the process configuration system to establish another user interface therefor via one of the workstations of FIG. 1.

With reference now to FIG. 3, the data stored in the configuration database may be presented to a user via a configuration database administrative interface such as DeltaV® Explorer, which will hereinafter be referred to as "the Explorer system" with the understanding that any database administrative interface may be utilized. The Explorer system sets forth a configuration hierarchy in a windows-type environment having a suite of configuration tools for modifying the elements of the hierarchy. More particularly, a main window 80 developed by the Explorer system includes a hierarchy frame 82 in which the configuration hierarchy is displayed and a contents frame 84 in which additional information for each component of the hierarchy is displayed. The hierarchy frame 82 includes a plurality of icons that identify various levels of the hierarchy, such as a top level 86 representative of the entire process configuration, as well as two secondary levels representative of a library folder 88 and a system configuration folder 90. The library folder 88 may include the information utilized during process design in which function blocks and/or modules are applied within a phase or process as part of a control program. The system configuration folder 90 then includes the results of the design procedures in one or more folders therein, such as a recipes folder 92. Each folder beyond the secondary level may be expanded or contracted within the hierarchy frame in accordance with known windowing techniques. Alternatively, the components of a folder may be displayed in the contents frame 84 by selecting the name of the folder using a pointer or the like. For example, the contents of a control program LOOP associated with AREA_A utilizes a number of items or objects, the names of which are identified in the contents frame 84. Selecting one of these items may provide the user with information relating to properties of the item (e.g., object type, application used to develop the item, data storage location, etc.), as well as a graphical display of a sequential flow chart in a process configuration application (e.g., Control Studio) or a textual display if no sequential flow chart exists.

It should be noted that the tools provided by the process configuration applications (e.g., Control Studio™ and Recipe Studio™) and the Explorer system described in connection with FIGS. 2 and 3, respectively, may be integrated into a single application to any desired extent. Furthermore, the exact manner in which the configuration of the process is accomplished is not pertinent to the practice of the present invention. Thus, for purposes of simplicity in explanation only, as used hereinafter, the "configuration applications" should be understood to include the process configuration applications described in connection with FIG. 2 as well as the Explorer system described in connection with FIG. 3.

Figure 4:
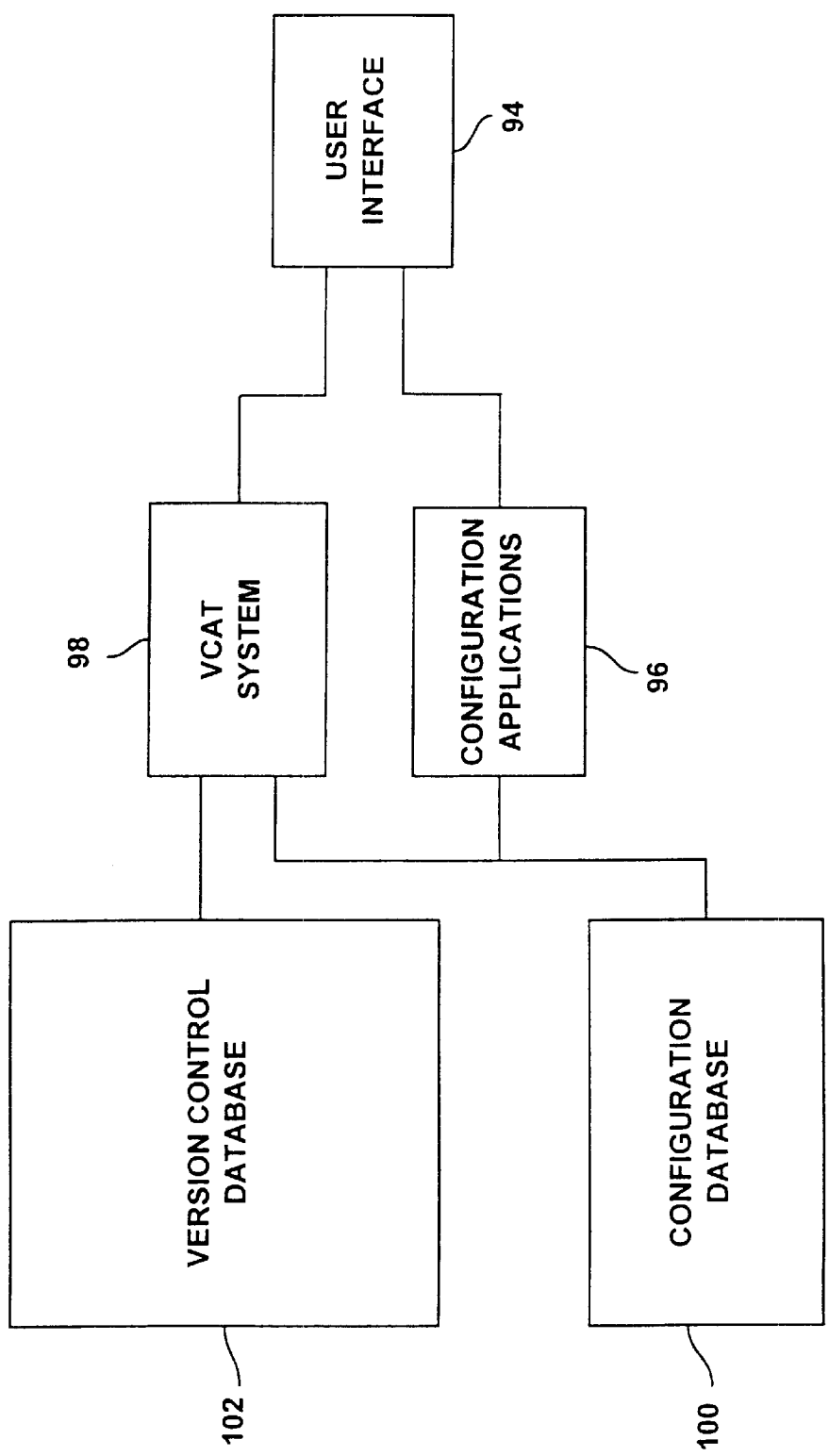
FIG. 4 is a block diagram of the process configuration system integrated with a version control and audit trail system in accordance with one embodiment of the present invention.

With reference to FIG. 4, a user interface 94 is generated on the display 22 of one of the workstations 14 (FIG. 1) to enable a user to implement one or more configuration applications 96. In accordance with the present invention, the user interface 94 is also generated in connection with a version control and audit trail system 98 (hereinafter "the VCAT system"), which, in general, cooperates with the configuration applications 96 to record and administer historical information regarding the configuration of the process. Both the configuration applications 96 and the VCAT system 98 access and otherwise communicate with a configuration database 100, which, as described hereinabove, stores data representative of the current configuration of the process. The VCAT system 98 is also in communication with a version control database 102, which is administered thereby in accordance with the present invention.

The version control database 102 includes configuration history data indicative of any number of prior versions of each item utilized in the process configuration. Taken together, the history data for all of the items may be used to reconstruct past configurations of the process. More particularly, for each item in the configuration database 100 (as well as those no longer in the configuration database 100), data representative of the configuration of that item is stored for a plurality of versions. For example, an item may have been modified on three occasions since it was created. The version control database 102 would therefore have data indicative of the configuration of the item at the point of creation, which may be referred to as "Version 1," as well as data indicative of the configuration of the item after each of the three modifications, which would correspond with "Version 2," "Version 3," and "Version 4."

The configuration history data is thus representative of all of the modifications made to the function blocks, modules, phases, recipes and any other aspects of the process configuration. The modifications may, but need not, be made using the configuration applications 96. In such a case, however, practice of the present invention is preferably accomplished by integrating the functionality of the VCAT system 98 into the user interface 94 generated by the configuration applications 96, as shown schematically in FIG. 4 and as explained in greater detail hereinbelow. To this end, the configuration applications 96 and the VCAT system 98 may, but need not, be combined into a single, integrated system. To the extent necessary for clarity, however, tasks executed in accordance with the present invention will be attributed to the configuration applications 96 and the VCAT system 98 separately.

The VCAT system 98 is preferably implemented using one or more of the workstations 14 in a manner that allows for the monitoring of any modifications to the process configuration. Such monitoring may be furthered by the integrated system described hereinabove. Alternatively, the VCAT system 98 may be executed on a workstation or other device that does not correspond with the workstation 14 utilized by the operator or process designer, but which is in communication with the process control system 10 for recording data indicative of the configuration modifications.

The data in one or both of the databases 100, 102 may be stored in a computer-readable medium physically located anywhere within the process control system 10, such as, for example, the memory 20 or a magnetic or optical storage medium associated with one of the workstations 14. Alternatively, one or both of the databases 100, 102 may be stored in a remote location such that the workstation 14 accesses the data stored therein over a network such as an intranet, the Internet, or any other communication medium. Furthermore, the data stored in each database 100, 102 need not be stored in the same computer-readable medium, such that any portion of either database 100, 102 may be stored in a memory device or medium which is distinct from devices or media storing other portions.

In FIG. 4, the VCAT system 98 is shown as distinct and separate from the version control database 102. In an alternative embodiment, the version control database 102 forms a portion of the VCAT system 98. Similarly, the configuration database 100 and the version control database 102 may, but need not, constitute separate and distinct data structures. That is, the databases 100, 102 may be located in the same storage medium and, in fact, may compose portions of a common database dedicated to the process control system 10. Accordingly, a "database," as used herein, should be understood to not be limited to any particular data structure.

In one embodiment, the version control database 102 comprises a relational database. Alternatively, the version control database 102 may be generated using a reference application that provides version control tools, such as Microsoft Visual SourceSafe®, as the version control data repository. In yet another alternative embodiment, the version control database 102 may be file-based.

Figure 5:
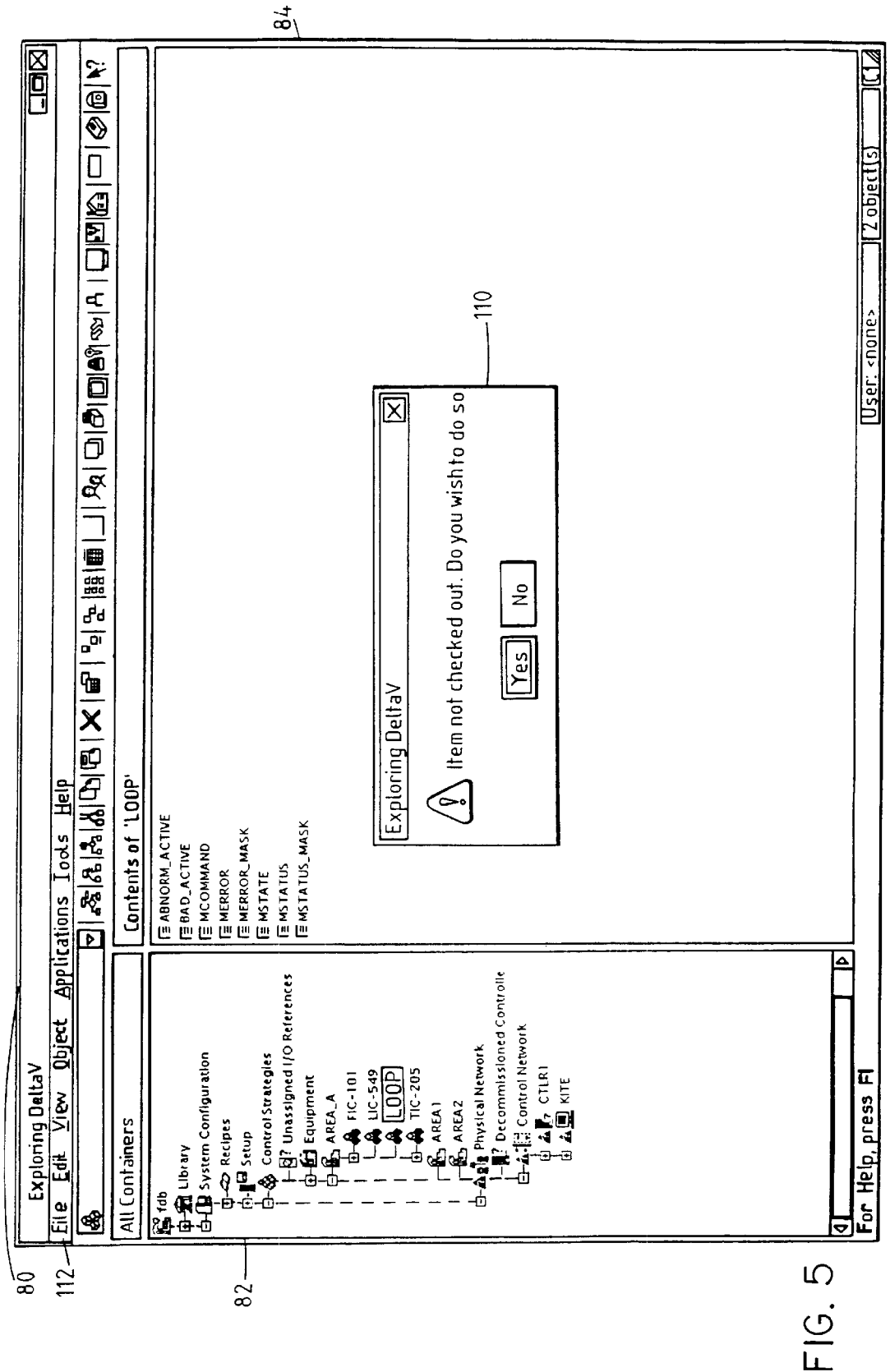

FIG. 5 is a screen display for the user interface 94 similar to that shown in FIG. 3 but incorporating functionality provided by the VCAT system 98 in an integrated fashion with the configuration applications 96. In such an integrated system, one or more tools have been added to the configuration applications 96 for implementation and control of the VCAT system 98 in the context of the administration of the process control system 10. For example, when the VCAT system 98 is enabled (as explained in greater detail hereinbelow), and a user attempts to view and/or modify an item administered by the configuration applications 96 by double-clicking or otherwise selecting it, a dialog 110 is generated within the user interface 94 that alerts the user of the need to "check-out" the item from the configuration database 100 before proceeding. Similarly, when a user adds a new item to the process configuration, such an integrated system automatically adds the new item to both the configuration database 100 as well as the version control database 102, and checks out the item to facilitate its creation within the configuration applications 96.

In short, the VCAT system 98 preferably imposes a check-out/check-in environment on the design of the process. In this environment, an item must be checked-out (either manually or automatically) before modifications may be made so that the VCAT system 98 may record information relating to the item and, in so doing, generally prepare for an upcoming "check-in" operation. If, for instance, the item "MCOMMAND" shown in the contents frame 84 requires modification, the user would have selected the item in the contents frame 84, and selected a "YES" option within the dialog 110, after which the configuration database 100 storing the current version of the process is accessed to retrieve the data associated with that item. The retrieved data is representative of information that may be displayed in one or more ways, such as textually or graphically. Thus, functionality provided by the configuration applications 96 (e.g., Control Studio™) may be necessary to view or modify the retrieved information. In any event, the appropriate application is utilized to view the information and make any desired modifications, at which time the user would typically execute a Save task.

It should be noted that the functionality provided by the configuration applications 96 related to merely viewing the configuration of an item need not be affected by the integration with the VCAT system 98. That is, the VCAT system 98 preferably allows the user to view a "read-only" copy of the configuration information without requiring or initiating the check-out/check-in procedure.

The initiation of a Save task to store such modified information associated with the item preferably precedes the check-in of the item. More particularly, execution of the Save task first causes the configuration applications 96 to store data representative of the modified information associated with the item in the configuration database 100. Next, the VCAT system 102 begins execution of the check-in task to store data representative of the modified information in the version control database 102. Execution of the check-in task may include the generation of another dialog (not shown) that allows the user to enter a comment regarding the check-in operation. The comment may, for instance, be directed to the reason behind the modification to the configuration. Data representative of the comment is then stored in the version control database 102 and associated with the data representative of the modified configuration.

The check-out/check-in environment is preferably limited to only those items in the configuration database 100 that are "versionable." In general, a versionable item should be understood to include any item for which historical configuration information is maintained or stored in association with the item itself. In a preferred embodiment, versionable items include those items the configuration of which has been designed, such as any module, composite function block, etc. Although other items, such as a module parameter, are considered not versionable, historical information may be stored via the configuration information stored for the item that contains the module parameter or other non-versionable item. Another example of a non-versionable item is a step or transition.

In one embodiment, the check-out operation is limited to the extent that only a single check-out is permitted. In this manner, two or more users may not attempt to check-out the same item. In the event that a user attempts to check-out a previously checked out item, the VCAT system 98 generates a dialog window (not shown) to inform the user of the previous check-out, together with the identity of the user responsible for the prior check-out. Alternatively, the VCAT system 98 may include the functionality necessary to track concurrent modifications of each item.

In another embodiment, initiation of the check-out operation causes the VCAT system to analyze the selected item to determine which, if any, items in the version control database 102 may be affected by modifications to the selected item. Other items may, for instance, be affected if they utilize the selected item. The items that may be affected by modifications to the selected item can then be identified in a dialog window (not shown) generated by the VCAT system 98 to permit the user to select which, if any, of the items should also be checked out. A similar dialog window may be generated during the check-in procedure to alert the user of any checked out items that are referenced by, relied upon by, or otherwise associated with the selected item.

The option to initiate the check-out and check-in operations, or any other task executed within the VCAT system 98, may be provided within the user interface 94 in a number of ways. In a windows-type environment such as that described and shown above in connection with the configuration applications 96, a user may select from a top level menu bar 112 a "Tools" option, which results in the display of a plurality of available tasks in accordance with known windowing techniques. The same or a similar menu may be generated within the user interface by "right-clicking" on an item in the main window 80 of the configuration application 96. In that case, the menu may be referred to as a "context menu."

Figure 6:
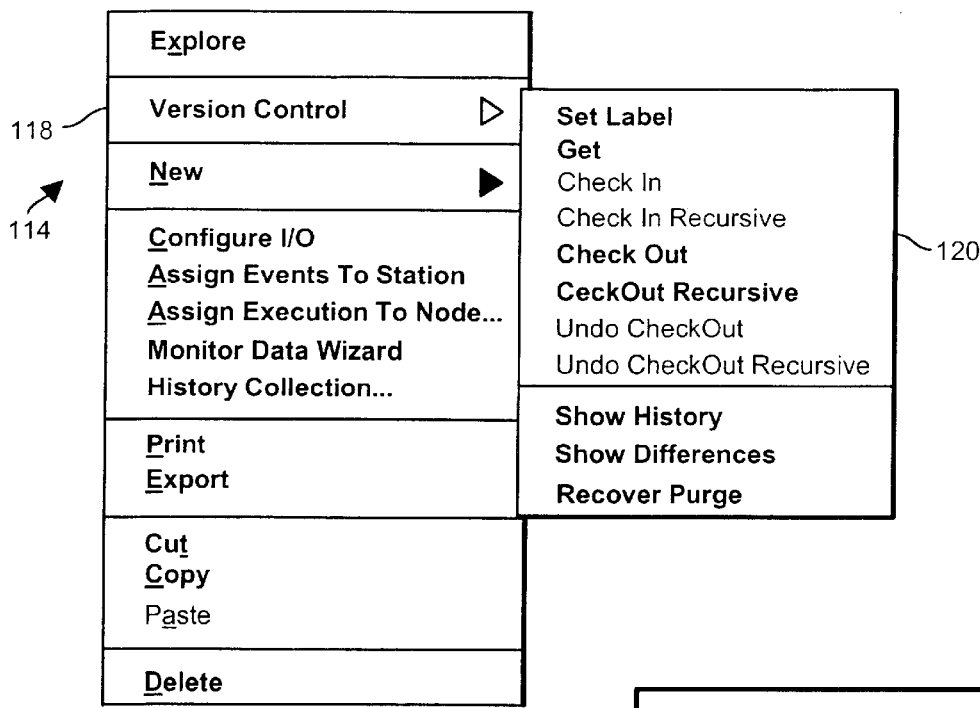
Figure 7:
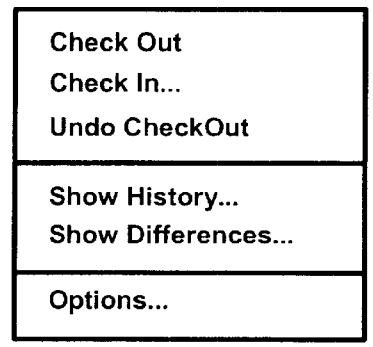

FIGS. 6 and 7 show examples of a drop-down menu 114 and a context menu 116, respectively, that may be generated within the user interface 94 by the VCAT system 98. The drop-down menu 114 includes a plurality of task items that may be selected by the user via a pointing device or the like. A version control item 118 is shown as highlighted (after appropriate selection by the user) to generate a version control sub-menu 120 in accordance with known windowing techniques. The version control sub-menu 120, in turn, includes a plurality of task items that correspond with tasks that may be initiated and/or executed by the VCAT system 98. The context menu 116 similarly includes a plurality of task items that correspond with VCAT system tasks that can act upon the item selected within the main window 80. In either menu, commands that are not available for execution for whatever reason (e.g., inapplicability or lack of authorization) may be displayed as disabled in a different font, style, etc. For example, in the sub-menu 120 of FIG. 6, the item selected presumably is yet to be checked-out and, accordingly, the check-in task cannot be initiated. Each of the tasks made available via the menus 116, 120 are described hereinbelow in connection with the operation of the VCAT system 98.

Figure 8:
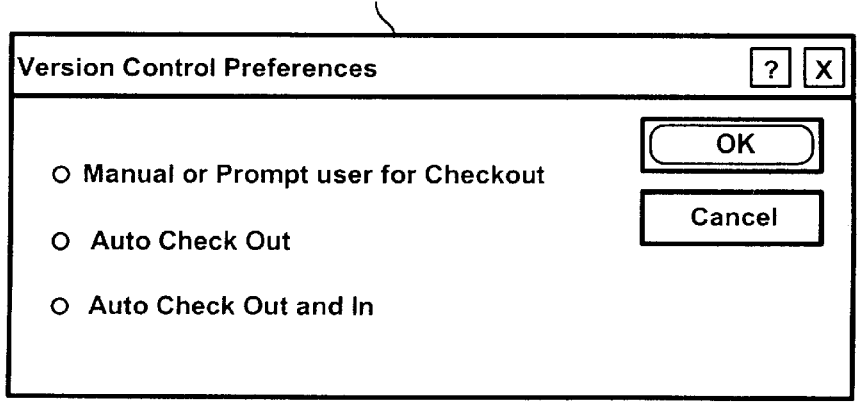

With reference now to FIG. 8, if the user selects the "Options" item in the context menu 116 (FIG. 7) or, alternatively, a "Preferences" item set forth in another menu (not shown), a version control preferences dialog 122 is generated by the VCAT system 98 for display on the user interface 94. The version control preferences dialog 122 enables the user to establish user preferences for the environment created by the VCAT system 98. As set forth in detail in Table 1 below, the version control preferences dialog 122 provides checkboxes for toggling between three respective options. The first option determines whether the user prefers to manually check items out. The second option in the version control options dialog 122 concerns whether an item will be automatically checked out when the user attempts to, or otherwise initiates, the modification of an item. In the event that items are automatically checked-out, the VCAT system 98 becomes more transparent to the process designer utilizing the configuration applications 96. The third and final option concerns whether items will be automatically checked out and checked in when the user attempts to save an item after a session that provides an opportunity for modification.

It should be noted that the version control preferences dialog 122 may include other options to be elected or enabled by each user. For example, each user may be given the option of not providing comments during a check-in operation. Further details regarding the provision of such comments, however, will be provided in connection with Table 2 below.

TABLE 1

Version Control Preferences Dialog

| Name | Type | Min | Max | Default | Content |
|---|---|---|---|---|---|
| Manual Check-out | Radio Button | n/a | n/a | Selected | Determines if a dialog is displayed to prompt user to check-out an item for modification. |
| Automatic check-out | Radio Button | n/a | n/a | Not selected | Indicates if item will be automatically checked out. |
| Automatic Check-out and Check-in | Radio Button | n/a | n/a | Not selected | Indicates if item will be automatically checked out and checked in when modifying an item configuration. |

The user may wish to select automatic check-out because, for instance, changes to one versionable item may affect and cause changes to one or more other versionable items. For example, the modification of an item such as a composite function block may affect one or more modules that use the composite function block. The VCAT system 98 preferably determines during each check-out operation which other versionable items need to be checked out in order to modify the configuration of an item. The modification of these other versionable items may be referred to as "consequential changes." If the user has elected manual check-out, then the VCAT system 98 prompts the user to check these items out. If automatic check-out is enabled, the VCAT system 98 does not prompt the user and automatically checks out each of the other items for which consequential changes may occur.

The user may check-out and check-in items manually by utilizing the appropriate command offered via the version control sub-menu 120 or the context menu 116. Preferably, the VCAT system 98 then determines whether the selected item is a versionable item. At this time, the VCAT system 98 also determines whether the selected item has already been checked out. In the event that the selected item is already checked out, a message dialog (not shown) will alert the user of the fact and provide the user with an opportunity via, for instance, a button, to dismiss the message dialog and return to the previous state of the user interface 94.

Because the configuration of the process 10 is set forth in a hierarchal manner, the VCAT system 98 must allow for checking out items having subordinate items that are also versionable. Accordingly, during a check-out operation, the user is provided with the option of recursively checking out any such items. A similar option is provided in connection with the check-in operation. In one embodiment, if a recursive check-out or check-in is selected by the user, the VCAT system 98 generates a dialog window (not shown) that provides the user with a list of versionable, subordinate items that may be checked out (or checked in). The user may then select (or de-select) any one of the listed items to initiate a selective recursive operation.

When the VCAT system 98 is integrated with the configuration applications 96, the appearance of the items displayed within the main window 80 may be modified to denote that the item has been checked-out. In one embodiment, a checkmark overlays the icon associated with the item. It should be understood that a variety of other appearance schemes may be utilized. Checkmarks of different colors may also be utilized to denote specific users or when the item was checked out by the current user or a different user.

Figure 9:
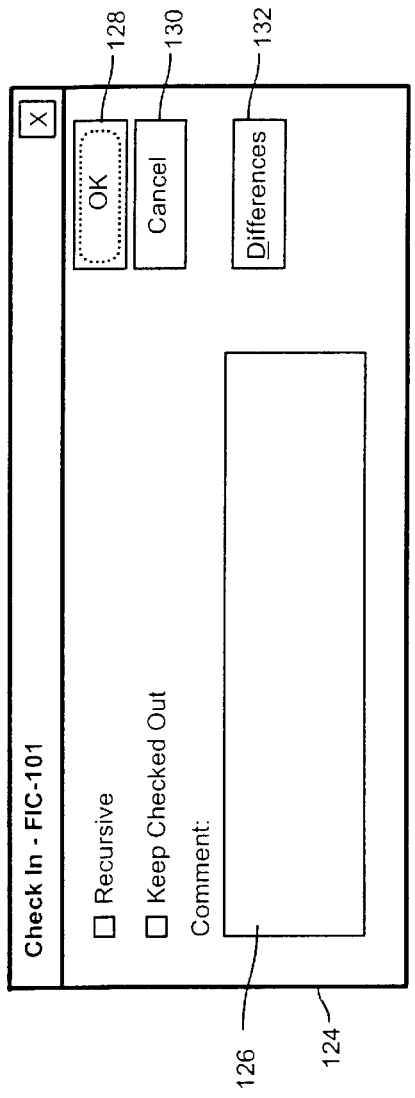

With reference now to FIG. 9, checked out items may be manually checked in using the appropriate commands made available in the version control sub-menu 120 and the context menu 116. A check-in dialog window 124 is preferably generated upon user initiation of the check-in procedure when the user has elected to proceed with a manual check-in environment. The check-in dialog window 124 includes a comment field 126 for accepting user-supplied commentary regarding the modification of the item. The commentary may, for instance, include an explanation of why the modifications were made. In addition to the comment field 126, the check-in dialog window 124 provides several other options to the user, each of which is described in detail below in Table 2. In particular, the user is provided with the options of designating that any subordinate items associated with the item to be checked in (that are also checked out) should be checked in, and electing that the item should remain checked out for further modifications. As set forth above, the check-in operation also stores data representative of the configuration in the version control database 102 as the latest configuration version. In this case, however, even though the item has been checked in, the opportunity to make further modifications to the configuration of the item remains persists because the item remains checked out.

The check-in dialog window 124 provides "OK" and "Cancel" buttons 128 and 130 for executing or canceling the check-in procedure, respectively, as well as a "Differences" button 132 that initiates a comparison of the current version of the item (as represented by data stored in the configuration database 100) and the modified version to be checked in. The comparison information is generated by the VCAT system 98 by accessing the configuration database 100 and the latest version in the version control database 102 and presented via the user interface 94. The generation and presentation of the "Differences" information will be discussed in greater detail hereinbelow.

TABLE 2

Version Control Check-In Dialog

| Name | Type | Min | Max | Default | Content |
|---|---|---|---|---|---|
| Recursive | Checkbox | n/a | n/a | Not checked | Checks in any subordinate items that are checked out by this user; preferably only applicable to certain levels of the configuration hierarchy. |
| Keep checked out | Checkbox | n/a | n/a | Not checked | Indicates whether the VCAT system should keep the item checked out. |
| Differences | Button | n/a | n/a | n/a | Difference between latest version (to be checked in) and the current version in the configuration database |
| Comment | Edit field | n/a | n/a | Empty | User-supplied description of change. |

Upon checking in an item, the VCAT system 98 may modify the appearance of the item to indicate that the item has been checked-in. This appearance modification may, for example, amount to the removal of a check-mark over the icon associated therewith. The VCAT system 98 may further include functionality that permits the user to request a status update for all of the items in the configuration database 100 to ensure that those items that are checked out are indicated as such via a checkmark or the like. Such functionality may be necessary, for instance, if two or more users are working on configuring the process at the same time, and one of the users has recently checked out an item shown on the user interface 94 of another user.

Selection of the "Cancel" button within the check-in dialog window 124 closes the Check-in dialog window without initiating a check-in operation.

The VCAT system 98, however, may also enable a user to initiate an "undo checkout" task that removes the checkmark over the icon and, if the item was modified, retrieves the data indicative of the latest version from the version control database 102, and imports the data into the configuration database 100. This procedure restores the configuration of the versionable item to the version that was current as of the time of the check-out operation. This task may be made available via a drop-down or context menu associated with the VCAT system 98.

The configuration applications 96 may provide additional ways to initiate the check-out/check-in operations. For example, the user may select an item in the Explorer system and access the "Properties" associated therewith via a right-click or similar pointer maneuver. A Properties window is then generated in accordance with standard windowing techniques that provides for editing of the contents of various "properties" fields displayed within the window. A module, for instance, may have a textual description associated therewith, or utilize certain parameters during execution within the process. The textual description and parameter values may be specified as "Properties" of the module. If the user modifies a property and selects an "OK" or "Apply" button, the VCAT system 98 prompts the user to check-out the item (if automatic check-out is not enabled), after which a check-in procedure is initiated as described hereinabove. Similar actions may be generated via utilization of an "Open" command made available in a command menu of the process configuration applications.

A check-out procedure may also be initiated by the VCAT system 98 when a user attempts to rename an item within the Explorer system. In accordance with standard windowing techniques, the user may select the name associated with an item to allow for editing thereof. Once the user is finished editing the name and attempts to enter the modification, the new name will only be accepted if the item is checked out. If the item is already checked out, the item is renamed in the configuration database 100, and data indicative of a new version of the item is stored in the version control database 102 when it is checked in. At that time, the VCAT system 98 may generate further data representative of commentary that describes the renaming operation, and then associate such data with the data indicative of the new version of the item. If the item to be renamed is not yet checked out, the user is prompted to check-out the item via a dialog window (not shown) to that effect (if automatic check-out is not enabled).

As set forth above, data representative of each prior configuration of an item is stored in the version control database 102 together with data reflective of a version assigned thereto. The version is preferably identified by number, but may be indicated in any other manner. Having each prior configuration associated with a version number may assist the user during an analysis of the contents of the version control database 102, as well as when the process is in the run-time environment. To this end, the version number or identifier of an item is preferably included as an item parameter when the item is downloaded to the controller 12 and/or a batch executive routine. (The batch executive routine resides on the workstation 14 to manage the execution of a batch process and oversee the controller 12 in connection therewith.) In other words, the data downloaded from the workstations 14 when the process control system 10 is preparing to implement a process includes version identifying data for certain items in the configuration database 100 (i.e., each module, phase, procedural element, etc.) that are involved in the download operation. The version information is then available in the run-time environment to a process operator via the controller 12 and/or the batch executive. Knowledge of the version information may assist in the communication between the process operators and the process designers working within the configuration applications 96.

It should be noted that downloading an item to the controller 12, or the run-time environment in general, involves one or more dialog windows (not shown) generated by the configuration applications 96 for the user interface 94 that guide the user through the download procedure. These dialog windows may correspond with the same windows generated by the configuration applications 96 when the VCAT system 98 is not integrated therewith. However, the VCAT system 98 may verify that all items to be downloaded are not checked out before allowing the download procedure to proceed. If any items are checked out, the VCAT system 98 may generate one or more error dialog windows (not shown) that alert the user to the situation and identify the checked out items. Such error dialog windows may facilitate the check-in procedure by providing a button therein directed to initiating a check-in procedure of one or more checked out items identified in the dialog window.

Figure 10:
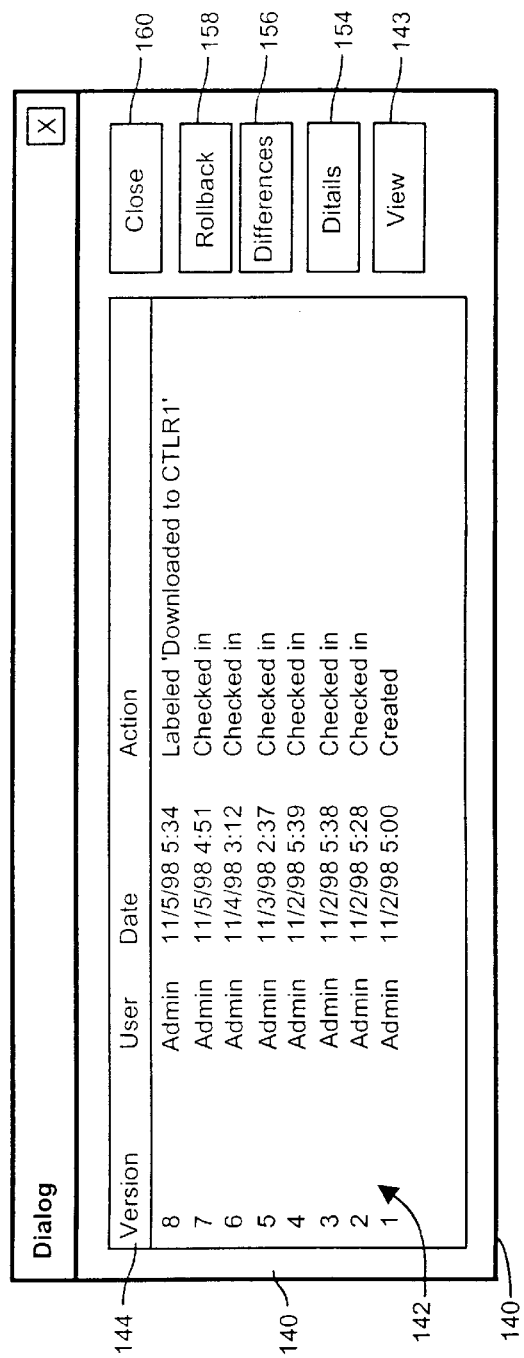

With reference now to FIG. 10, the version identifying information may be made available to the process designers via a version audit report (hereinafter "audit report") generated by the VCAT system 98 in accordance with one embodiment of the present invention. In general, each change or modification to the process configuration is recorded in the version control database 102 as a specific version associated with the process. The data indicative of the version and the substance of the modification may be linked to data representative of the check-in date and time, the user who checked-in the item, and the reasons for the modification. It should be noted that the VCAT system 98 may also store data representative of the check-out date and time, as well as the identity of the user checking out the item.

The audit trail report may be provided to the user via an audit trail dialog window 140 generated by the VCAT system 98 for the user interface 94. More particularly, a "Show history" task may be initiated by the user by using one of the above-described techniques involving, for instance, the context menu 116, while the user is within one of the configuration applications 96. The audit trail of history may also be provided to the user via any other display device, such as a printer, or may be embodied in an electronic version of the report such that, for instance, data representative of the audit trail is delivered electronically over a network.

The audit trail dialog window 140 includes a table portion 142 having a header 144 that identifies a plurality of field names for presenting version information relating to a version number, a user name associated with the check-out, the data and time of the check-in, and a description of the modification or action. The version information is presented in lines (or records) beneath the field names as shown in FIG. 10. Each record is selectable via a pointer or otherwise to initiate a variety of operations. The functionality provided by the VCAT system 98 in connection with the audit trail dialog window is summarized below in Table 3.

TABLE 3

Audit Trail Dialog Window

| Name | Type | Min | Max | Default | Content |
|---|---|---|---|---|---|
| Version, User, Date, Action | List control | n/a | n/a | n/a | Each line corresponds with a history record for the item. |
| Close | Button | n/a | n/a | Enabled | Closes the dialog. |
| Rollback | Button | n/a | n/a | Enabled | Rollback to the selected version. |
| Differences | Button | n/a | n/a | Enabled | Compares two selected versions or selected version with current version. |
| Details | Button | n/a | n/a | Enabled | Displays comments of selected version. |
| View | Button | n/a | n/a | Enabled | Displays the exportable item in text or graphical format. |

As set forth in Table 3, the user may view the details of a version of the item by selecting the line of the table portion 142 corresponding with that version and then selecting a View button 143. The data stored in the version control database 102 is then accessed to present the configuration information for the selected version of the item in either a textual or graphical format, or both, based on the nature of the item. Certain items, for instance, may only constitute text and, thus, may not be viewed in the graphical format. For example, versionable items such as a workstation or I/O device only contain parameters that can be modified. The parameters are set forth in text and, thus, no graphical view would be available for such items. Some items, however, may be viewed in both the graphical format and the textual format and generally include items such as modules, composite function blocks, or other items based on a sequential flow chart algorithm. In such cases, the user may be prompted to elect one of the formats or, alternatively, both formats may be presented.

An example of an item shown in the textual format is shown in FIG. 11, which is a screen display generated by the VCAT system 98 for the user interface 94. The screen display includes a text view window 146 having a frame 148 for the textual information associated with the item. The text view window 146 provides the user with several viewing options or operations which will be described hereinbelow.

FIG. 12 is an example of a screen display of an item shown in the graphical format. Like the screen display for the textual format, the graphical format is presented via a graphical view window 150 having a frame 152 for the graphical information associated with the item.

Returning to FIG. 11 and Table 3, the user may also analyze any comments recorded at the time of check-in for a particular version by selecting a Details button 154 after highlighting the desired version. The comments are preferably stored via the check-in dialog window 124, but other schemes may be utilized to associate data representative of comments with a particular version. The audit trail dialog window 140 further allows the user to select two versions of the item by using a pointer (or other selection mechanism) to highlight the corresponding two records in the table portion 142. Highlighting two records enables the user to initiate a Differences operation by selecting a Differences button 156, which, in turn, causes the VCAT system 98 to generate a Differences window dialog that provides the configuration information for each selected version of the item in a format that permits the user to compare the two versions. The details of the Differences operation will described in greater detail hereinbelow. If only a single record has been highlighted, and the Differences button 156 is selected, the VCAT system 98 will generate the Differences window such that the selected version is compared with the current version of the item stored in the configuration database 100.

The audit trail dialog window 140 also generally enables the user to implement one of the prior versions of the configuration of the item. More particularly, the VCAT system 98 may be directed by the user to initiate a routine that accesses the version control database 102 to retrieve the data representative of a prior configuration version in order to modify the data stored in the configuration database 100 in connection with the selected item. The modification of the configuration database 100 may then occur by importing the data from the version control database 102 into the configuration database 100. To implement this "rollback" to a prior configuration version of an item, and in accordance with one embodiment, the audit trail dialog window 140 includes a Rollback button 158 that may be selected by the user once a record in the table portion 142 has been selected.

In one embodiment, the VCAT system 98 provides the user with the option to rollback to a configuration that was downloaded to the controller 12 for utilization within the run-time environment. Such a rollback operation may be initiated by selection of a task item such as "Recover download" from a drop-down or context menu, and include the generation by the VCAT system 98 of a specialized audit trail dialog window (not shown) that only lists those versions that were downloaded. As will be described in greater detail hereinbelow, the version control database 102 preferably includes data indicative of whether a version was downloaded for use in the run-time environment. A version may then be selected by the user, the configuration information for which is then retrieved from the version control database 102 by the VCAT system 98 and stored as the latest configuration version.

Preferably, the VCAT system 98 determines whether the configuration data import operation is successful by checking for other items in the configuration hierarchy and process that depend upon the item. For example, when a configuration version of a module is being restored, the configuration version may require a certain subordinate item (e.g., composite function) block to exist. The module is then said to have a "dependency" in the sense that the success of the rollback operation is dependent upon the continued existence of that subordinate item. A module may have numerous different types of dependencies, such as embedded function blocks, linked function blocks, enumeration sets, alarm types, other modules, plant areas, and controllers. Accordingly, in one embodiment, the VCAT system 98 checks each subordinate item of the item being subjected to a rollback to determine whether any versionable items have been deleted.

In a preferred embodiment, the data imported into the configuration database is checked into the version control database 102 as well as the latest configuration version of the item. The check-in occurs concurrently with the modification of the configuration database 100, and preferably includes the storage of data representative of a comment indicating that the user reverted back to a prior configuration version of the item. Alternatively, the VCAT system 98 may generate a dialog window to provide the user with the option of entering a customized comment, entering a default comment, or no comment at all. If the item was checked out before the rollback task was initiated, the VCAT system 98 may, but need not, keep the item checked out after the rollback task is completed.

Lastly, the audit trail dialog window 140 includes a button 160 for dismissing the dialog window 140 and returning the user interface 94 to its previous state.

Figure 13:
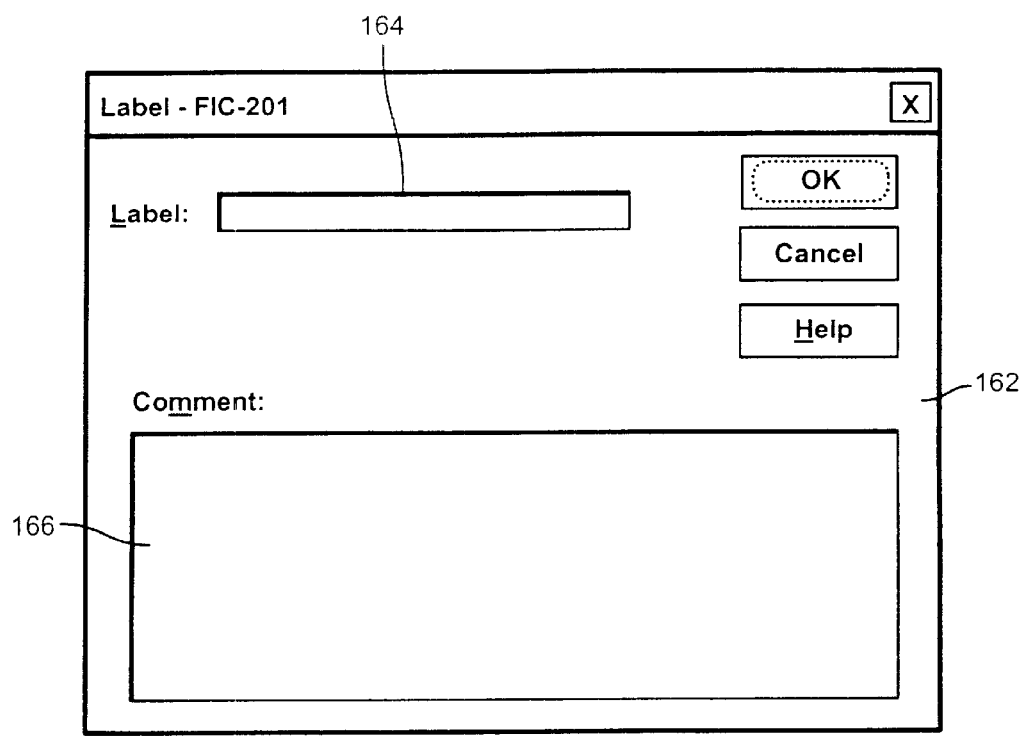

As shown in FIG. 10, one of the actions (other than a check-in operation) recorded in the audit trail report is a label setting operation for the entire process configuration. With reference now to FIG. 13, the user may initiate a Set Label operation by selecting a versionable item within, for instance, one of the modules designed using the configuration applications, and selecting the Set Label task via either a drop-down or context menu generated by the VCAT system 98. In response, the VCAT system 98 generates a Set Label dialog window 162 that includes a label field 164 and a comment field 166. The user is then prompted to enter a label to be applied to the selected item (and subordinate items) in the version control database 102. The latest configuration version of each item stored in the version control database 102 is then assigned the user-entered label. The audit trail data stored in the version control database 102 is also updated to reflect the assignment of the label, which is preferably applied to the latest configuration version. More particularly, the version action in the audit trail configuration history data will reflect that the version corresponds with a newly assigned label having the entered name, and the details associated therewith will correspond to the information entered by the user in the comment field 166 of the Set Label dialog window 162.

Setting a label may be advantageous for a process designer in the sense that the process designer may manually note via a label, such as "DOWNLOADED TO CONTROLLER1," which configuration versions of various items were downloaded to the controller 12 for implementation in the process. Preferably, however, the VCAT system 98 automatically assigns a label for each downloaded item to flag the configuration version as having been downloaded to the run-time device. Data representative of further information such as the date and time of the download and the items that were downloaded concurrently may also be stored in connection with the label.

The VCAT system 98 may then accordingly provide the capability to revert back the configuration of the entire process, or some portion thereof, to the version associated with a label set via the above-described procedure for each of the affected items in the version control database 102. In one embodiment, this capability applies only to the root (or top level) item in the configuration hierarchy developed using the configuration applications 96. In such case, a "Revert System to Label" task may be initiated when the user has selected the root item and proceeds to select the appropriate task item from a drop-down menu or a context menu similar to the menu shown in FIG. 7. A warning dialog (not shown) may be generated by the VCAT system 98 prompting the user for verification of intent to revert the system back to a label. If the user indicates that a "Revert System to Label" task is desired, the user may then be prompted for the name of the label to which the system will be reverted back. Alternatively, the VCAT system 98 may automatically revert the system back to the last label set in the version control database 102. In any event, once the Revert System to Label task is executed, the VCAT system 98 accesses the version control database 102 to retrieve the data representative of the configuration version associated with the label for each item, and imports the retrieved data into the configuration database 100. The VCAT system 98 then modifies the version control database 102 to reflect the reversion by storing data indicative of a new configuration version for each item as well as data associated therewith that reflects the reversion back to the label. In one embodiment, this data may be associated with the configuration version by storing data representative of a comment that indicates the reversion back to the label.

Figure 14:
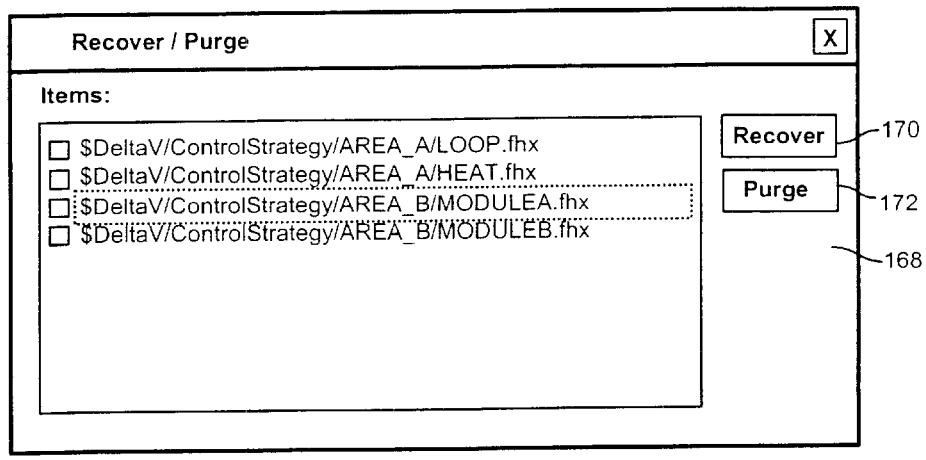

In accordance with one embodiment, the VCAT system 98 preferably still stores data in the version control database 102 that is representative of an item that was deleted or otherwise removed from the configuration database 100. In such a case, the version control database 102 may be relied upon when and if the user decides to revert back to a process configuration utilizing the deleted item. Referring now to FIG. 14, the VCAT system 98 may also enable a user to purge items that have been deleted from the configuration database 100. To that end, the VCAT system 98 generates a Recover/Purge dialog window 168 having a list of such deleted items. The Recover/Purge dialog window 168 may be generated upon selection of a Recover/Purge task item in either a drop-down or context menu. Such a task item may be enabled or other made available to the user after selection of an item within the configuration applications 96. If the selected item has one or more subordinate items that have been deleted from the configuration database 100, the user may initiate the recover operation via the dialog window 168 to add data representative of one or more of the deleted items to the configuration database 100.

The Recover/Purge dialog window 168 includes a Recover button 170 for restoring one or more deleted items in the list that have been selected by the user. When restoring a deleted item, the VCAT system 98 may access the version control database 102 to retrieve the latest configuration version of the deleted item, and then import the data associated therewith into the configuration database 100. Alternatively, the VCAT system 98 prompts the user for selection of a prior configuration version to the extent multiple versions are stored in the version control database 102.

Selection of a purge button 172 provided in the dialog window 168, on the other hand, results in the removal of any data associated with the item from the version control database 102. Further details regarding the Recover/Purge dialog window 168 are provided below in Table 4.

TABLE 4

Recover/Purge Dialog Window

| Name | Type | Min | Max | Default | Content |
|------|------|-----|-----|---------|---------|
| Items | Check list boxes | n/a | n/a | List of subordinate items deleted based upon a selected parent | List all subordinate items deleted based upon a selected parent. |
| Recover | Button | n/a | n/a | n/a | Item is restored to the configuration database by retrieving the data from the version control database and importing the item into the configuration database. |

TABLE 4-continued

Recover/Purge Dialog Window

| Name | Type | Min | Max | Default | Content |
|------|------|-----|-----|---------|---------|
| Purge | Button | n/a | n/a | n/a | Item and all audit trail history data are removed from the version control database permanently |

In accordance with one embodiment of the invention, the VCAT system 98 supports version control and audit trail functionality for items that are not created, developed, or managed by the configuration applications 96. For example, a user may create a document in a word processing program that describes the functionality of a particular item. It would be desirable to store and track any editing of the document as the configuration and, hence, the description, are modified. To this end, the main control window 80 generated by the Explorer system for the user interface 94 is utilized to designate a new version control item. More particularly, the user first expands a "User Workspace" object (i.e., an object in the Explorer system). A task item directed to creating a new folder within the hierarchy frame 82 is then selected by the user, and a new folder is created and named in accordance with known windowing techniques. Similarly, a task item directed to creating a new item is selected, and the user is then provided with the opportunity to browse for a document or file to insert as a new item in the recently created folder. Once the document or file is inserted into the folder, it is then added to the version control database 102 as another item for which versions and version-related information can be stored. Subsequently, any version of the file or document may be retrieved from the version control database 102 using a Get task item made available to the user via a drop-down or context menu. The Get task provides the user with a dialog window (not shown) that prompts for a desired storage location for the retrieved file, such as a floppy disk. The native application utilized to create the file or document (e.g., a word processing application) may then be used to access the contents of the file or document from the designated storage location.

Figure 15:
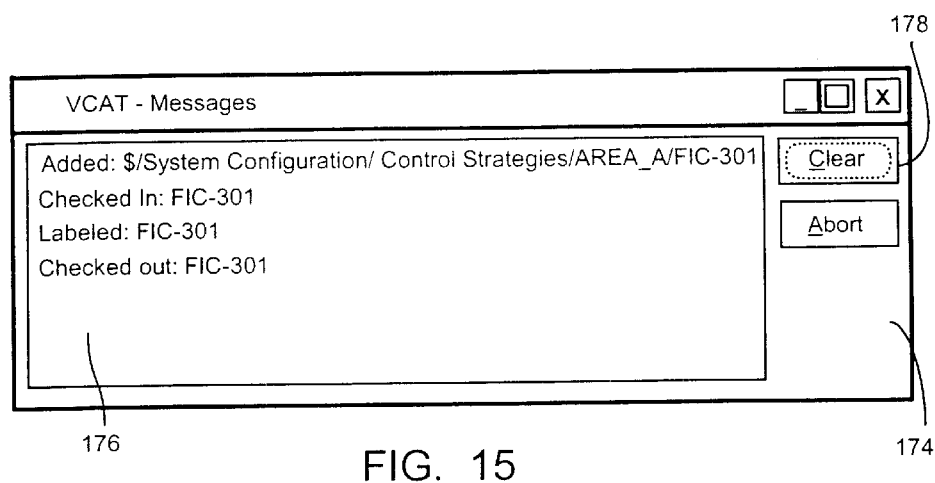

With reference now to FIG. 15, the VCAT system 98 preferably generates a message dialog window 174 for display of version control feedback information to the user via the user interface 94. The message dialog window 174 includes a text box 176 in which textual descriptions of each version control operation is documented as it occurs. Generally, the message dialog window 174 permits the user to scroll through a history of the operations that have occurred since a Clear button 178 was last selected by the user. An Abort button 180 is also provided to enable a user to abort a version control operation at the next opportunity. For example, if the user has initiated a rollback operation, execution of the operation by the VCAT system 98 may be ceased via selection of the Abort button 180 unless, for instance, execution of the operation has already been completed. The message dialog window 174 may automatically minimize in accordance with known windowing techniques if version control operations have not occurred for a certain period of time. The message dialog window 174 is then automatically re-displayed on the user interface 94 upon initiation of the next version control operation.

The manner in which the VCAT system 98 provides the user with a textual view of the configuration of an item via the textual view dialog window 146 will now be described in connection with FIG. 11. The VCAT system 98 may, but need not, be capable of displaying the configuration information of each item in the version control database 102 in a textual format. As explained above, some items, by their nature, may have configuration information that also may be displayed graphically.

The format in which the configuration information for an item is set forth is not pertinent to the practice of the present invention. However, the VCAT system 98 preferably utilizes a textual format that minimizes the amount of horizontal scrolling necessary for user viewing of both a single configuration version of an item as well as when comparing two versions. Furthermore, it is preferred that key words and labels be utilized to identify attributes such as object type and properties. Examples of item-type identifying labels that may be utilized include "PARAMETER," "FUNCTION_BLOCK," and "CONTROLLER." Examples of property labels are "NAME" and "DESCRIPTION." The key words and labels may then be translated to the appropriate language. For example, a Japanese version of the user interface 94 would display the key words in Japanese. Conditional and other logic statements in the language may also be translated into an easy-to-read format for display in the textual view.

In one embodiment, the textual format for each item includes delimiting language such as BEGIN and END. For example, as shown in FIG. 11, configuration version number 13 of a module has a parameter delimited by the following BEGIN and END statements:

BEGIN Parameter "ABS_PRESS_CF"

END Parameter "ABS_PRESS_CF"

In another embodiment, the name of the item may not be identified in conjunction with a label, such as in the following example:

```
BEGIN FUNCTION_BLOCK
NAME = "AI1"
DEFINITION = "AI1"
DESCRIPTION = "Analog Input"
LEFT = 200
TOP = 200
HEIGHT = 125
WIDTH 400
END FUNCTION_BLOCK
```

The textual view dialog window 146 includes a find button 200, a find down button 202, and a find up button 204. The buttons 200, 202, and 204 generally allow the user to navigate the textual information set forth in the frame 148 in accordance with a character string selected therein with a pointer or the like in accordance with known windowing techniques. To this end, initiating the find operation by selecting the find button 200 may cause the VCAT system 98 to generate a find dialog window (not shown) to facilitate the user's navigation of the frame 148. A character string may then be entered into a field and, the first instance of the string may be found by, for example, selecting an "OK" button (not shown) in the find dialog window. The user may subsequently use the buttons 202, 204 to find instances of the string in either the down or up directions, respectively. Further information with regard to these operations and others provided via the textual view dialog window 146 is set forth below in Table 5.

TABLE 5

Textual View Dialog Window

| Name | Type | Min | Max | Default | Content |
|---|---|---|---|---|---|
| Find | Button | n/a | n/a | Enabled | Allows user to enter a search string. |
| Find down | Button | n/a | n/a | Disabled | Navigates to next instance of the search string |
| Find up | Button | n/a | n/a | Disabled | Navigates to previous instance of the search string |

At this point, it would be instructive to describe in greater detail the manner in which the textual information set forth in the dialog window 146 is generated by the VCAT system 98 from the data representative thereof stored in the version control database 102. It should first be understood that the manner in which the version control data is stored is not critical to practice of certain aspects of the present invention. In one embodiment of the present invention, however, the version control data is preferably stored in the version control database 102 in a file-based format. In an alternative embodiment, the data is stored in an object-oriented fashion such that the version control database comprises an object-oriented database.

The version control database 102 is preferably administered using the DeltaV™ Database Administrator application available from Fisher-Rosemont, Inc. modified to the extent necessary to handle both of the databases 100, 102. Alternatively, the Microsoft SQL Server® Enterprise Manager may be utilized for this purpose.

To generate the textual information representative of the configuration version, the VCAT system 98 executes a routine that generally accesses the version control database 102 to export the pertinent data in a manner that can be translated into either a text- or graphical-based format. To this end, during a check-in operation, the VCAT system 98 stores a text-based representation of the version control data in a file in accordance with a markup language, such as XML (Extensible Markup Language). The text contained in the XML document that is generated at this point may be serialized into a single character string that is stored in the version control database 102. More particularly, in one embodiment, each versionable item may have a database record corresponding to each configuration version. In that case, each configuration version record has a field dedicated to having a single character string of XML text stored therein that represents the version control data associated with the configuration version. Preferably, these configuration version records make up one table of a plurality of tables in the version control database 102, which, in this case, is a relational database. The relational database may include other tables directed to storing the following: (1) whether each versionable item is deleted, the current version identifier, whether the item is currently checked out and, if applicable, to whom; and, (2) the audit trail information for each versionable item.

In a preferred embodiment, all of the configuration data necessary to completely define a configuration of an item is separately stored for each version. Alternatively, the configuration data may be stored in manner that only defines the differences between versions, in which case the data associated with multiple database fields would have to be accessed to develop the XML document for a particular version The version control data is thereby set forth in a structured manner that can be easily manipulated and parsed when the version control database 102 is later accessed. To develop the configuration information shown in the example of FIG. 11, the VCAT system 98 interprets the XML representation of the version control data to provide the configuration information in an easy-to-read textual format. The manner in which the XML-formatted data is processed should be readily appreciated by those skilled in the art, but will now be briefly described in greater detail.

At the time of the filing of the instant application, XML is a markup language well known to those skilled in the art and believed to be in the midst of the standardization as XML 1.0 by the World Wide Web Consortium (www.w3.org). While other data schemes may be utilized, the use of any one of a number of markup languages is preferred to facilitate the generation of both textual and graphical representations of the configuration of the item.

Generally speaking, a document set forth in XML has a logical structure composed of declarations, comments, and processing instructions, as well as nodes that start with a single root (or document) element. For example, a versionable item may have an initial or root "MODULE" element to represent a portion of a control strategy. This MODULE element may contain an attribute node called NAME, which has a text node containing the name of the module. Additionally, the module may contain element nodes to describe the module. Such elements may include, for example, ALGORITHM_TYPE, DESCRIPTION, EXECUTION SPEED, AND MODULE_TYPE. Each of these elements may have a textual node that maintains a value representative of that particular portion of the configuration. The MODULE element node may further include element nodes that contain additional elements, thereby creating a hierarchy. For example, a MODULE may include a STEP, and the STEP may include one or more ACTION elements. The ACTION elements, in turn, include elements such as NAME, DESCRIPTION, ACTION_TYPE, and the like.

Thus, the XML format sets forth the version control data with the aid of tags in a manner similar to that found in HyperText Markup Language (HTML) documents. In XML documents, however, the tags may be customized to the types of data being stored, as described above. For example, the function block for which a textual representation was provided hereinabove is set forth below in XML format:

<Function_Block>
  <Name>AI1</Name>
  <Definition>AI</Definition>
  <Description>Analog Input</Description>
  <Left>200</Left>
  <Top>200</Top>
  <Height>125</Height>
  <Width>400</Width>
</Function_Block>

The data stored in an XML document is accessed in accordance with an object model that provides for parsing the document to create a data tree structure having a plurality of nodes associated with the version control data. Practice of the present invention may utilize any one of several different object models, such as the Document Object Model as applied to XML.

Thus, the textual information provided in the textual view dialog window 146 via the user interface 94 is generated by loading the XML text in the database field to create the above-described object nodes for the configuration version. The document object model may then be used to traverse the data structure established by the object nodes in order to extract the configuration information and generate the textual format shown in FIG. 11 for the selected version and item.

The graphical view dialog window 150 of FIG. 12 is also generated from the above-described XML-based routine. As will be readily recognized to those skilled in the art, the same XML document utilized to generate the textual information may be able to support a graphical representation, given the necessary objects in the tree structure, together with the knowledge of how certain objects are to be displayed. With a limited number of object types available, such knowledge is provided by the VCAT system 98. For instance, when the XML document indicates that an item is a function block, the VCAT system 98 may initiate a routine for a generic drawing function block and, in so doing, refer again to the data provided in the XML document to draw the function block in accordance with other parameters.

It should be understood that not every item may be displayed graphically. However, items that may be displayed graphically include, but are not limited to, those that are generally defined by a function block or sequential flow chart algorithm.

The graphical view dialog window 150 that results from a user's selection of a configuration version in the audit trail dialog window 140 provides a user with various options to facilitate review of the configuration. More particularly, the dialog window 150 includes a text view button 206 that allows the user to display the configuration information displayed in the frame 152 in a textual format in accordance with the above-described manner. The text view button 206 may also be directed to a particular subordinate item displayed in the frame 152. More particularly, after a user has selected the subordinate item, the text view button 206 may be selected to view the configuration information of the subordinate item in a textual format. Alternatively, the subordinate item may be selected using a right-click or the like to generate a context menu 207 that provides the text view task as an item to be selected.

The dialog window 150 further includes a Display Parent button 208 and a Drill Down button 210. The Drill Down button 210 provides the user with the option to display (to the extent possible) the configuration information for a subordinate item of the originally selected item in a graphical format. Once an item (such as a composite function block 212) displayed in the frame 152 is selected by the user, the Drill Down button 210 is enabled for selection by a user with a pointer or the like. The button 210 may then be selected to "drill" into the subordinate item to display graphical configuration information related thereto. The Drill Down task may also be initiated using the context menu 207.

The Display Parent button 208 provides the user with the option to return to a graphical view of the parent item by removing the view of the subordinate item. Alternatively, the subordinate item may be displayed in a separate dialog window such that the display parent operation causes the VCAT system 98 to close the dialog window associated with the subordinate item and thereby return to the graphical view of the parent item.

In an alternative embodiment, if no graphical view is available for a subordinate item (because, for instance, it does not constitute a composite function block or a module), then a textual view dialog window will be generated. It shall be understood that eventually the act of drilling into subordinate items within a graphical view dialog window will result in a textual view dialog window.

It shall be appreciated that utilizing an XML document generated on-the-fly as an intermediary between the version control database 102 and the generation of the user interface 94 provides an efficient, flexible approach to the presentation of configuration information. More importantly, however, generating an XML document for each configuration version also provides for the rapid and efficient comparison of two versions of a selected item.

Comparing versions of an item is useful in the general context of version control to determine what is commonly referred to as "Differences" between versions. With respect to the process control system 10 set forth hereinabove, it would be beneficial to display the differences between two versions of an item both textually and graphically. In a preferred embodiment, the VCAT system 98 generates Differences dialog windows for both textual and graphical presentations of the differences between two versions using the above-described, XML-based processing of the data stored in the version control database 102. Because the tree structure of an XML document is easily parsed in accordance with the object model, two versions of an item may be easily compared by parsing the corresponding two XML documents and comparing the parsed data object-by-object.

Figure 16:
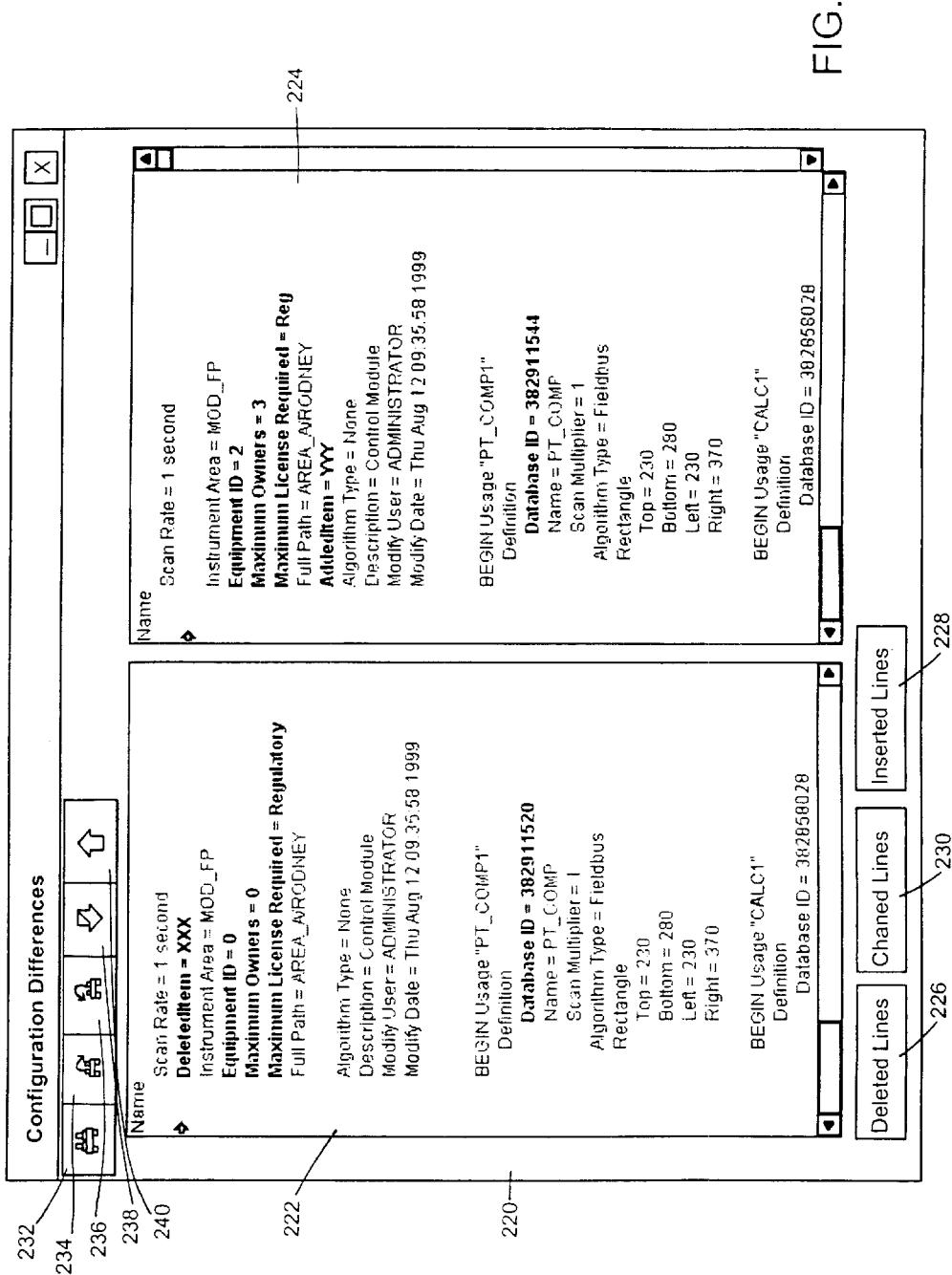

With reference now to FIG. 16, a textual differences dialog window 220 includes a first frame 222 and a second frame 224 for displaying configuration information for a first configuration version and a second configuration version, respectively. Both horizontal and vertical scrolling of the textual information displayed in each frame 222, 224 is provided for using known windowing techniques. The first frame 222 may set forth the configuration information for an older version (e.g., Version number 13), while the second frame may set forth the configuration information for a more recent version (e.g., Version 14). It should be noted, however, that the versions need not be consecutively numbered, inasmuch as any two versions may be compared by the VCAT system 98. As the older version, the first frame 222 may include one or more lines of text that were deleted as a result of a check-out/check-in modification of the configuration. Preferably, the text associated with such deleted lines is shown in a different color (e.g., blue), font, or style than the remaining text. To denote that blue-colored text, for instance, is representative of a deleted line, a button 226 may include the text "Deleted lines" in a blue color. Similarly, the frame 224 may include one or more lines of text that were inserted as a result of a modification to the configuration of the item. Such lines of text may, for instance, be set forth in a green color, as well as a button 228 having the green-colored text "Inserted Text." Lastly, the content of one or more lines of text may have been changed (but not deleted entirely) between versions. Such lines may be set forth in a red color in both of the frames 222, 224, together with a button 230 having the red-colored text "Changed Text." It should be understood that any color or style scheme might be utilized to differentiate the above-identified types of differences and to set the changed text apart from the text common to both versions.

The textual differences dialog window 220 also includes a find button 232, a find down 234, a find up button 236, a Down button 238, and an Up button 240 that provide the same navigational functionality described hereinabove in connection with the textual view dialog window 146. These navigation tools preferably apply to both of the frames 222, 224, such that any vertical scrolling operation initiated by the user results in the scrolling of both frames. In an alternative embodiment, these navigation tools (as well as other standard scrolling techniques in a windows environment) may be applied to one of the frames 222, 224 based upon, for instance, which frame has been selected by a user.

The textual information for the versions being compared need not be set forth in a side-by-side manner. For instance, the textual differences dialog window may alternatively include a single frame wherein the common text, changed text, inserted lines, and deleted lines are shown and differentiated via a similar color or style scheme. Differences between the two versions may also be shown in that context by using redlining, underlining, demarcating punctuation, and the like.

Figure 17:
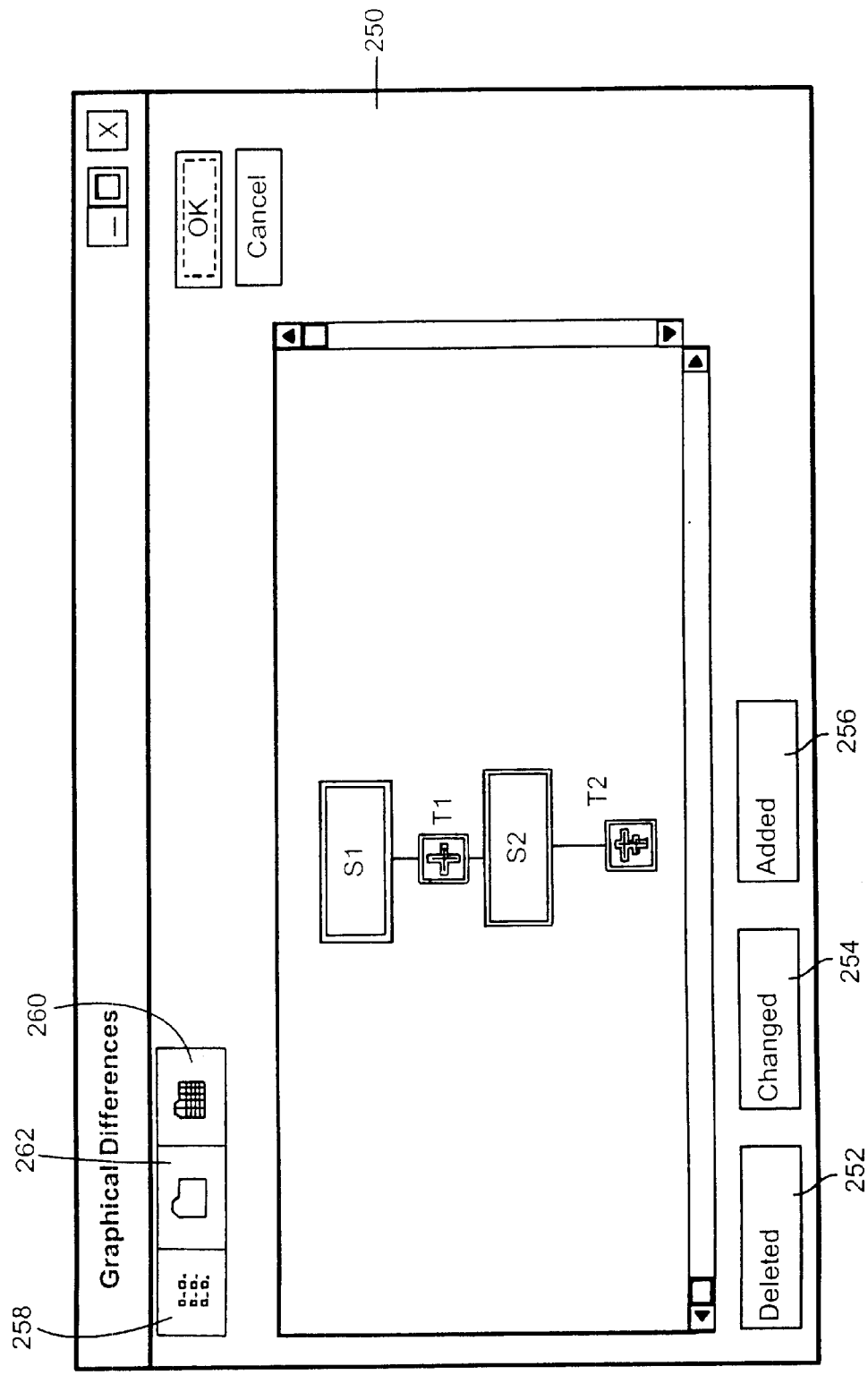

A graphical differences dialog window 250 is shown in FIG. 17. The graphical differences dialog window 250 is based on a single frame window similar to the graphical view dialog window 150, but may alternatively use a two frame, side-by-side window to juxtapose the versions. To differentiate between common objects, deleted objects, added objects, and changed objects, a color scheme may again be employed. The colors may be applied to the objects as a background color, a border, a matting, an outline, etc. Buttons 252, 254, and 256 are set forth as a key to the color scheme in the same manner as set forth hereinabove in connection with the textual differences dialog window 220. For example, a step item S1 and a transition item T1 are shown with a colored border (e.g., red) to indicate that the items have been modified. A further step item S2 and further transition item T2 are shown with a different colored border (e.g., blue) to indicate that the items have been deleted or removed.

It should be noted that the color scheme may also be applied to the lines interconnecting the items.

Exemplary changes to an item that are denoted by a colored outline or frame include adding an action to a step and changing the expression of a transition. Changes to the execution order of the function blocks may be denoted by outlining, framing, etc. only the portion of the object dedicated to displaying the execution order. This portion may, for instance, be located at the bottom of an object. In the event that an object was renamed between versions, the color scheme may be employed to show the two versions of the object as deleted and added. Alternatively, the VCAT system 98 may provide the user with the option of only displaying substantive differences between versions, such that cosmetic changes are not displayed.

The graphical differences dialog window 250 also includes a Display text button 258 that provides the same functionality as the button 206 with respect to both the selected item and any subordinate item.

If a subordinate item is shown as having been modified, the VCAT system 98 provides the user with the capability of drilling into the item (through appropriate selection thereof) to generate either a textual differences dialog window or another graphical differences dialog window for that subordinate item. In one embodiment, drilling down is only available for those items for which a graphical dialog window may be generated. In general, however, which type of dialog window will be generated depends on the type of item as explained hereinabove. Drilling into a subordinate item may also be initiated by selection thereof followed by selection of a drill down button 260. A return to the previous graphical differences dialog window 250 may be accomplished by selection of a Display Parent button 262 that operates in the same manner as the button 208.

When an item that has been removed is at the same location in the graphical differences dialog window as an item that has been added, one of the items may be obscured. Additionally, when a comments is changed, the old comment will not be visible in the graphical view. To allow the user to see the hidden item or comment, the VCAT system 98 may provide a mechanism (via a menu item or selection sequence using a pointer or the like) to toggle between which item or comment is shown (i.e., on top) and which item is obscured from view.

In a preferred embodiment, the above-described textual view and graphical view dialog windows, including those directed to viewing differences, include a button or task item sequence that permits a user to toggle between textual and graphical displays. The VCAT system 98 would preferably only include such functionality on dialog windows for items that can be displayed in both formats.

It should be understood that the VCAT system 98 may impose a security check on the version control environment. For example, for an operation (e.g., rollback) that requires a certain level or type of authorization, the VCAT system 98 may determine before executing the operation whether the user is authorized to initiate the operation.

When a new user is added to the VCAT system 98, the VCAT system 98 may generate a new user dialog window (not shown) having a plurality of checkboxes corresponding with a plurality of VCAT operations that may be selected or not selected to provide the user with a desired amount of authorization.

It should be further understood that the VCAT system 98 may provide a user having appropriate authorization with the option of enabling or disabling the VCAT system 98. Once disabled, the VCAT system 98 would allow the configuration applications 96 to operate without imposing the check-out/check-in and other procedures. When re-enabled, the VCAT system 98 preferably performs a synchronization routine that accesses the configuration database 100 to compare the current configuration data with the latest configuration data stored in the version control database 102. For each item that encountered a configuration modification during the period that the VCAT system 98 was disabled, a new configuration version is added, and data representative of the current version in the configuration database 100 is stored in association therewith. New items may also be created in the version control database 102 to the extent necessary. Furthermore, a label may be assigned to all items in the version control database 102 to denote that the VCAT system 102 has been re-enabled.

The synchronization routine may also be executed at any time. In certain instances, it should be appreciated that the VCAT system 98 may have to initiate one or more undo check-out operations and/or check-out operations to the extent necessary to modify the version control database 102.

The VCAT system 98 may also include a database backup/restore routine similar to the routine utilized to backup and restore the configuration database 100 administered by the Explorer system. Other common database utilities, such as a "Clean Database" routine directed to repairing the data storage structure of the version control database 102, may also be included as part of the VCAT system 98.

The user interface 94 is preferably not the only output device by which version control information is provided to the users and operators of the VCAT system 98 and configuration applications 96. More particularly, one or more routines may be implemented by the VCAT system 98 to support the generation of reports for delivery to a printer or other display device. For example, the VCAT system 98 may provide the user with the ability to select task items directed to generating reports that present version control information related to which items are checked out, the audit trail of a particular item, the items checked out by a particular user, any deleted (but not purged) items, and a list of check-outs by date or some other parameter for which data may be stored in the version control database 102. Such information may be provided via any display device, whether located locally or remotely, and may be delivered in a format or in accordance with any protocol.

To facilitate the generation of such reports, the VCAT system 98 preferably includes a query system. The query system generally permits the user to specify search criteria directed to any number of subjects, such as modifications or actions by a particular user, modifications or version control events that occurred during a specified time frame, modifications or version control events that occurred within a specific version or label, and modifications or version control events that relate to a specific item or an area of items. After the user has entered the one or more criteria for a query, the VCAT system 98 will initiate a search routine that accesses the version control database 102 and analyzes the contents thereof. In a preferred embodiment, the VCAT system 98 executes the search routine in a background manner, such that other version control operations may be initiated and executed concurrently therewith.

Figure 18:
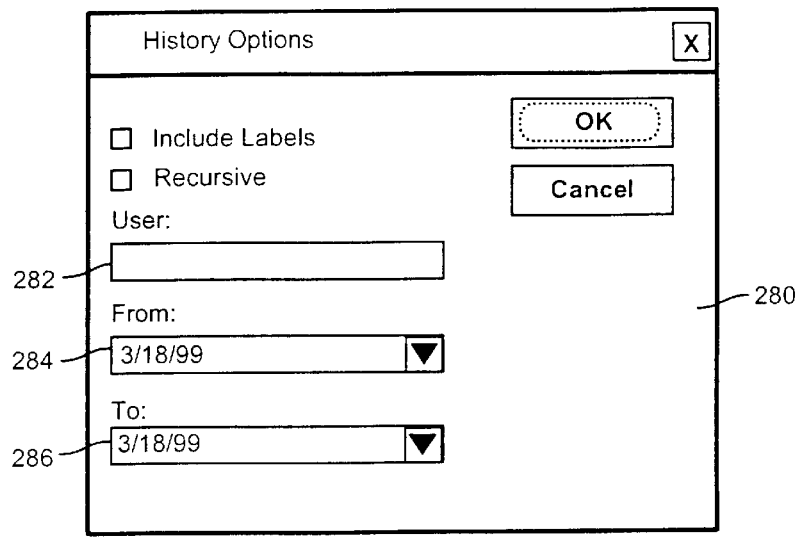
Figure 19:
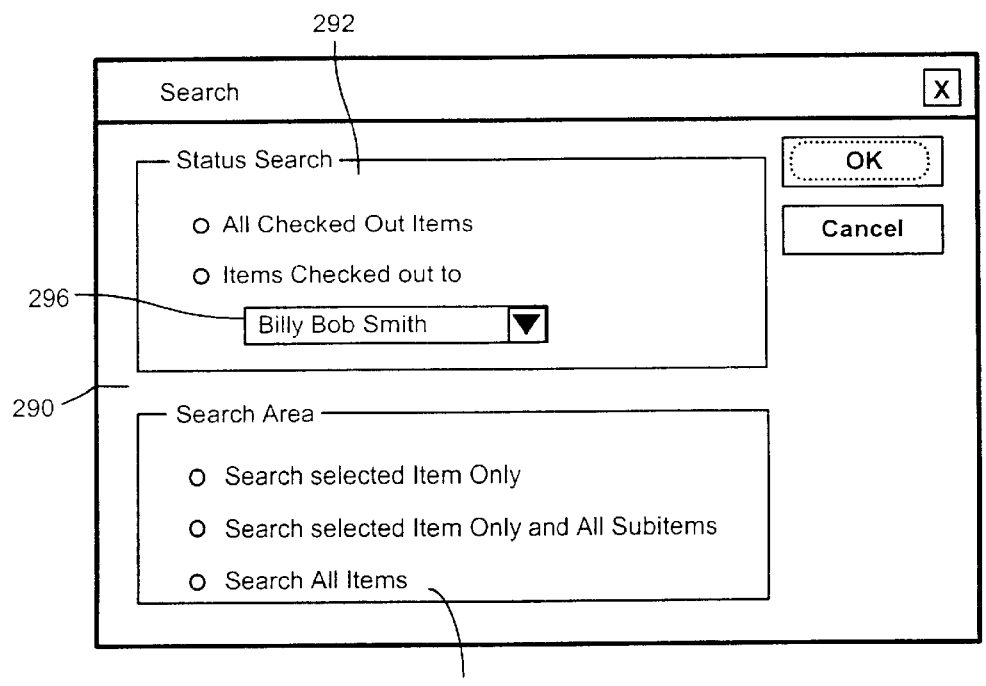

The query system may generate one or dialog windows for display via the user interface 94. Examples of two such dialog windows are shown in FIGS. 18 and 19. A history report options dialog window 280 may be generated after selection of an item followed by selection of a task item directed thereto via either a drop-down menu or context menu. The dialog window 280 provides checkboxes directed to whether the history report to be generated will include version control information concerning labels and subordinate items. A user field 282 is also provided to allow the history report to be directed to the modifications or version control events that were initiated by a specified user. Lastly, a "From date" field 284 and a "To date" field 286 may be used to specify a time period for the history report. To facilitate the entry of the starting and ending dates for the time period, a pop-up calendar or exemplary dates may be provided in a window generated for each field 284, 286 in accordance with known windowing techniques.

With reference to FIG. 19, the query system may generate a general search dialog window 290 that includes a status search portion 292 and a search area portion 294 for identifying certain search criteria. The status search portion 292 includes checkboxes for instructing the VCAT system 98 to search for all checked out items or items checked out to a certain user. The user may be specified via a user field 296 having the capability of suggesting user names via a drop down window. The search area portion 294 includes several checkboxes that permit the user to search the version control information relating to only the selected item, the selected item and all subordinate items, or all items in the version control database 102.

The screen displays of FIGS. 5–9, as well as other screens, may be created and modified using a windows-type format with standard windows-type commands, although any other format could be used as well. The format of these screen displays may be changed dramatically, for instance, in the event the VCAT system 98 is used in conjunction with configuration applications other than the Explorer system or the other applications specified hereinabove.

Although the configuration applications 96 and the VCAT system 98 described herein are preferably implemented in one or more software routines, they may be implemented in a routine embodied in hardware, firmware, etc., and may be implemented by any other processor associated with the process control system 10. Thus, each of the operations and procedures described hereinabove may be implemented in a standard multi-purpose CPU or on specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A configuration management system for tracking the configuration of process control system formed by a plurality of process control elements, the configuration management system comprising:
   a computer-readable medium;
   a processor in communication with the computer-readable medium;
   a first database that stores first data representative of a first configuration of the process control system;
   a second database that stores second data representative of a second configuration of the process control system;
   a configuration routine stored in the computer-readable medium and configured to be executed by the processor to facilitate a modification of the first configuration of the process control system; and
   a version control routine stored in the computer-readable medium and configured to be executed by the processor to store in the second database third data indicative of the modification of the first configuration of the process control system.

2. The configuration management system of claim 1, wherein the first database comprises a configuration database such that the first configuration of the process control system corresponds with a current configuration version.

3. The configuration management system of claim 1, wherein the second database comprises a version control database such that the second configuration of the process control system corresponds with a past configuration version.

4. The configuration management system of claim 1, wherein:
   the first and second configurations of the process control system comprise first and second pluralities of process items, respectively; and
   each process item of the first and second pluralities of process items has a respective item configuration such that
   the first configuration of the process control system comprises the item configuration of each process item of the first plurality of process items, and
   the second configuration of the process control system comprises the item configuration of each process item of the second plurality of process items.

5. The configuration management system of claim 1, wherein the version control routine monitors the modification of the first configuration of the process control system to gather the third data.

6. The configuration management system of claim 5, wherein the version control routine monitors the modification of the first configuration of the process control system by imposing a check-out/check-in procedure on the configuration routine.

7. The configuration management system of claim 6, wherein the check-out/check-in procedure is automatic.

8. The configuration mangaement system of claim 7, wherein the configuration routine is adapted to enable a user to choose between an automatic check-out/check-in procedure and a manual check-out/check-in procedure.

9. The configuration management system of claim 1, wherein the configuration routine is adapted to be executed by the processor to make changes to a first process control element and to propagate changes to other process control elements that are affected by the changes made to the first process control element.

10. The configuration management system of claim 1, wherein at least one of the process control elements includes an associated version and the process control system includes an associated version and wherein the versions are stored in one of the first and second databases.

11. The configuration management system of claim 10, wherein the version control routine is adapted to be executed by the processor to recall previous versions of the process control elements and to restore the process control elements to the pervious versions.

12. The configuration management system of claim 10, wherein the version control routine is adapted to be executed by the processor to determine a version of a plurality of process control elements operating in the process control system.

13. The configuration management system of claim 10, wherein the version control routine is adapted to be executed by the processor to determine differences between two versions of a process control element and to display the differences to a user.

14. The configuration management system of claim 10, wherein the version control routine is adapted to be executed by the processor to determine differences between two versions of the process control system and to display the differences to a user.

15. The configuration management system of claim 10, wherein the data representative of the versions of the process control elements are stored in a relational database format.

16. The configuration management system of claim 10, wherein the data representative of the versions of the process control elements are stored in an object oriented format.

17. The configuration management system of claim 10, wherein one of the first and second databases stores an associated name and history for one or more of the process control elements.

18. The configuration management system of claim 17, wherein the configuration routine enables a user to change names associated with process control elements and wherein the configuration routine associates histories of the process control elements with the changed names of the process control elements.

19. The configuration management system of claim 10, wherein the version control routine is adapted to be executed by the processor to recall previous versions of the process control system and to restore the process control system to the previous version.

20. The configuration management system of claim 1, wherein the version control routine is adapted to be executed by the processor to store the third data indicative of the modification of the first configuration of the process control elements in an extensible markup language (XML) format.

21. The configuration management system of claim 1, wherein the configuration routine is adapted to be executed by the processor to detect the presence of new items to the process control system.

22. The configuration management system of claim 1, wherein the configuration routine is adapted to be executed by the processor to track identities of persons who made changes to the process control system.

23. The configuration management system of claim 1, wherein the process control system executes batch processes and wherein the version control routine is adapted to determine versions of the process control elements that were used during the batch processes.

24. The configuration management system of claim 1, wherein the configuration routine and the version control routine may be executed while the process control system is operating.

25. The configuration management system of claim 1, wherein the configuration routine and the version control routine may be selectively enabled and disabled without regard to a state of the process control system.

26. A process control system having process control elements, comprising:
 a computer having a processor;
 a process configuration application adapted to be implemented by the processor to establish a versions of the process control system and the process control elements; and
 a version control system in communication with the process configuration application to record and control modifications to the versions of the process control system and the process control elements.

27. The process control system of claim 26, wherein the process configuration application and the version control system are integrated such that the recordation and control of the modification to the versions of the process control system and the process control elements occurs in a manner transparent to a user.

28. The process control system of claim 26, wherein the modification to the versions of the process control system and the process control items are recorded and controlled in an automated manner.

29. The process control system of claim 26, wherein the version control system stores data indicative of prior versions of the process control system and the process control elements.

30. The process control system of claim 29, wherein the version control system includes a comparison tool that provides a user interface for displaying differences between the version of the process control elements and the prior version of the process control elements.

31. The process control system of claim 30, wherein the user interface displays the difference graphically.

32. The process control system of claim 29, wherein the version control system includes a rollback tool to replace versions of the process control elements with the prior version of the process control elements.

33. The process control system of claim 32, wherein the rollback tool automatically determines whether any subordinate control elements of the process control elements have been deleted.

34. The process control system of claim 26, further comprising a process controller to which data reflective of the process control elements are downloaded wherein the version control system stores information indicative of the version of the process control elements to reflect when the data reflective of the process control elements is downloaded to the process controller.

35. The process control system of claim 26, further comprising a process controller to which data reflective of the process control elements is downloaded for implementation wherein the data includes information indicative of the version of the process control elements such that a process operator with access to the process controller may be informed of the version of the process control elements currently being implemented.

36. A method of controlling a process control system having a process control elements, the method comprising the steps of:

establishing a configuration of the process having a first version of the process control system and the process control elements;

controlling a modification of the configuration of the process control system and the process control elements to create a second version of the process control system and the process control elements; and recording information associated with the modification of the configuration of the process control system and the process control elements.

37. The method of claim 36, wherein the recording step is performed in a transparent manner.

38. The method of claim 36, wherein at least one of the controlling and recording steps are performed in an automated manner.

39. The method of claim 36, further comprising the step of providing a user interface for displaying differences between the first version of the process control elements and the second version of the process control elements.

40. The method of claim 39, wherein the user interface displays the differences graphically.

41. The method of claim 36, further comprising the step of replacing the second version of the process control elements with the first version of the process control elements.

42. The method of claim 41, wherein the replacing step comprises the step of determining whether any subordinate items of the process control elements have been deleted.

43. The method of claim 36, further comprising the step of storing information indicative of a downloaded version of the process control elements to reflect when data reflective of the process control elements is downloaded to a process controller.

44. The method of claim 36, further comprising the step of downloading to a process controller information indicative of a current versions of the process control elements such that a process operator with access to the process controller may be informed of the current version of the process control elements.

* * * * *

UNITED STATES PATENT AND TRADEMARK OFFICE
CERTIFICATE OF CORRECTION

PATENT NO. : 6,449,624 B1
DATED : September 10, 2002
INVENTOR(S) : Stephen Gerard Hammack et al.

It is certified that error appears in the above-identified patent and that said Letters Patent is hereby corrected as shown below:

Column 1,
Line 64, please delete "Delta$^{TM}$" and insert -- DeltaV$^{TM}$ --.
Line 65, please delete "Fisher-Rosemont" and insert -- Fisher-Rosemount --.

Column 3,
Line 56, please delete "Fisher-Rosemont" and insert -- Fisher-Rosemount --.

Column 5,
Line 3, please delete "Fisher-Rosemont" and insert -- Fisher-Rosemount --.

Column 16,
Linea 5-6, please delete "will described" and insert -- will be described --.

Column 20,
Line 43, please delete "Al1" and insert -- Al --.

Column 21,
Line 29, please delete "Fisher-Rosemont" and insert -- Fisher-Rosemount --.
Line 65, please delete "version" and insert -- version. --.

Column 27,
Line 51, please delete "5-9" and insert -- 5-19 --.

Column 29,
Line 8, please delete "management" and insert -- management --.

Column 30,
Line 25, please delete "a versions" and insert -- versions --.

UNITED STATES PATENT AND TRADEMARK OFFICE
CERTIFICATE OF CORRECTION

PATENT NO. : 6,449,624 B1
DATED : September 10, 2002
INVENTOR(S) : Stephen Gerard Hammack et al.

It is certified that error appears in the above-identified patent and that said Letters Patent is hereby corrected as shown below:

Column 32,
Line 23, please delete "of a current" and insert -- of current --.

Signed and Sealed this

Seventeenth Day of August, 2004

JON W. DUDAS
*Acting Director of the United States Patent and Trademark Office*